United States Patent
Leddy et al.

(10) Patent No.: US 7,041,401 B2
(45) Date of Patent: May 9, 2006

(54) MAGNETICALLY MODIFIED ELECTRODES CONTAINING AT LEAST ONE CATALYST COMPONENT THAT MEDIATES A SUBATOMIC PARTICLE TRANSFER PROCESS

(75) Inventors: Johna Leddy, Iowa City, IA (US); Chaminda Hettige, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 9 days.

(21) Appl. No.: 10/687,918

(22) Filed: Oct. 20, 2003

(65) Prior Publication Data

US 2004/0137283 A1 Jul. 15, 2004

Related U.S. Application Data

(60) Provisional application No. 60/419,101, filed on Oct. 18, 2002.

(51) Int. Cl.
 *H01M 4/86* (2006.01)
 *H01M 4/90* (2006.01)

(52) U.S. Cl. .............................. 429/10; 429/42; 429/43

(58) Field of Classification Search .................. 429/10, 429/40, 42, 43, 44
 See application file for complete search history.

(56) References Cited

U.S. PATENT DOCUMENTS

| | | | |
|---|---|---|---|
| 3,409,471 A | 11/1968 | Sturm et al. | |
| 3,811,952 A | 5/1974 | Siwersson et al. | 136/86 A |
| 3,853,628 A | 12/1974 | Fox | 136/86 D |
| 4,037,022 A | 7/1977 | Cheron | 429/10 |
| 4,201,827 A | 5/1980 | Heitkamp | 428/283 |
| 4,613,541 A | 9/1986 | Isoda | 428/212 |
| 4,711,245 A | 12/1987 | Higgins et al. | 128/635 |
| 4,902,555 A | 2/1990 | Isoda et al. | 428/195 |
| 4,978,610 A | 12/1990 | Forrest et al. | 435/7 |
| 5,011,786 A | 4/1991 | Isoda et al. | 437/51 |
| 5,205,920 A | 4/1993 | Oyama et al. | 204/403 |
| 5,208,154 A | 5/1993 | Weaver et al. | 435/176 |
| 5,234,777 A * | 8/1993 | Wilson | 429/33 |
| 5,262,305 A | 11/1993 | Heller et al. | 435/28 |
| 5,272,087 A | 12/1993 | El Murr et al. | 435/291 |
| 5,298,144 A | 3/1994 | Spokane | 204/403 |
| 5,391,272 A | 2/1995 | O'Daly et al. | 204/153.12 |
| 5,422,246 A | 6/1995 | Koopal et al. | 435/14 |
| 5,710,011 A | 1/1998 | Forrow et al. | 435/25 |
| 5,786,040 A | 7/1998 | Leddy et al. | 427/598 |
| 5,817,221 A | 10/1998 | Leddy et al. | 204/290 R |
| 5,869,200 A | 2/1999 | Nunnally | 429/10 |
| 5,871,625 A | 2/1999 | Leddy et al. | 204/290 R |
| 5,928,804 A | 7/1999 | Leddy et al. | 429/10 |
| 6,071,392 A | 6/2000 | Yamamoto et al. | 204/403 |
| 6,303,242 B1 | 10/2001 | Leddy et al. | 429/10 |
| 6,322,676 B1 | 11/2001 | Leddy et al. | 204/296 |
| 6,342,347 B1 | 1/2002 | Bauer | 435/4 |
| 6,355,166 B1 | 3/2002 | Amarasinghe et al. | 210/223 |
| 6,503,701 B1 | 1/2003 | Bauer | 435/4 |
| 6,615,078 B1 | 9/2003 | Burson et al. | 604/20 |
| 2002/0155476 A1 | 10/2002 | Pourmand et al. | 435/6 |
| 2003/0104119 A1 | 6/2003 | Wilson et al. | 427/2.1 |
| 2003/0124572 A1 | 7/2003 | Umek et al. | 435/6 |
| 2003/0150739 A1 | 8/2003 | Morozov et al. | 205/133 |
| 2003/0175803 A1 | 9/2003 | Tsionsky et al. | 435/7.1 |

FOREIGN PATENT DOCUMENTS

| | | |
|---|---|---|
| JP | 62215861 A2 | 9/1987 |
| JP | 63010562 A2 | 1/1988 |
| JP | 10106577 | 4/1998 |
| JP | 11323654 | 11/1999 |
| JP | 2000030743 | 1/2000 |
| JP | 2001-155746 | 6/2001 |
| JP | 2001155746 | 6/2001 |
| JP | 2001252553 | 9/2001 |
| WO | WO87/07386 | 12/1987 |
| WO | WO00/43783 | 7/2000 |
| WO | WO 02/01228 A2 | 1/2002 |
| WO | WO02/47246 A1 | 6/2002 |

OTHER PUBLICATIONS

C. Hettige et al., "Electron Transfer Rate Enhancement of Myoglobin in Magnetic Fields," 202$^{nd}$ Meeting of the Electrochemical Society (Oct. 21, 2002) p. 1.

L.A. Zook, "Morphological Modification of Nafion for Improved Electrochemical Flux," Thesis, Dec. 1996, pp. 1-134.

H. Pan et al., "Effect of magnetization treatment on the electrochemical properties of $La_{0.9}Sm_{0.1}Ni_{2.0}Co_{3.0}$ electrode alloy," J. Alloys and Compounds, vol. 327, 2001, pp. 136-140.

Johna Leddy et al., "Magnetically Modified Fuel Cells," 39$^{th}$ Power Source Proceedings, 2000, pp. 144-147.

(Continued)

*Primary Examiner*—Jonathan Crepeau
(74) *Attorney, Agent, or Firm*—Fleshner & Kim LLP

(57) ABSTRACT

Disclosed are magnetically modified electrodes containing at least one catalyst component that mediates a subatomic particle transfer process. Also disclosed are magnetically modified electrodes containing metalloproteins (metalloenzymes).

52 Claims, 9 Drawing Sheets

OTHER PUBLICATIONS

D.A.J. Rand, "Battery Systems for Electric Vehicles—A State-of-the-Art Review," Journal of Power Sources, 1979, vol. 4, pp. 101-143.

Robert F. Nelson, "Power requirements for batteries in hybrid electric vehicles," Journal of Power Sources, 2000, vol. 91, pp. 2-26.

Lester B. Lave et al., "Environmental Implications of Electric Cars," Science, vol. 268, May 19, 1995, pp. 993-995.

Alexander H. Tullo, "Maintaining A Charge," C&EN Northeast News Bureau, Jul. 15, 2002, pp. 25-26.

Nicholas J. Turro et al., "Magnetic Field and Magnetic Isotope Effects in Organic Photochemical Reactions. A Novel Probe of Reaction Mechanisms and a Method for Enrichment of Magnetic Isotopes," Acc. Chem. Res., 1980, vol. 13, pp. 369-377.

M. Feng et al., "Raman Spectroscopic and Electrochemical Characterization of Myoglobin Thin Film: Implication of the Role of Histidine 64 for Fast Heterogeneous Electron Transfer," J. Am. Chem. Soc., vol. 123, No. 13, Apr. 14, 2001, pp. 3013-3020.

A.F. Nassar et al., "Catalytic Reduction of Organohalide Pollutants by Myoglobin in a Biomembrane-like Surfactant Film," J. Am. Chem. Soc., vol. 117, No. 44, Nov. 8, 1995, pp. 10986-10993.

J.F. Rusling et al., "Enhanced Electron Transfer for Myoglobin in Surfactant Films on Electrodes," J. Am. Chem. Soc., vol. 115, No. 25, Dec. 15, 1993, pp. 11891-11897.

D. Mimica et al., "Electroreduction of nitride by hemin, myoglobin and hemoglobin in surfactant films," J. Electroanalytical Chemistry, vol. 497, 2001, pp. 106-113.

J. Niu et al., "The direct electrochemistry of cryo-hydrogel immobilized myoglobin at a glassy carbon electrode," vol. 399, Nos. 1-2, Dec. 19, 1995, pp. 41-46.

J.F. Rusling, "Liquid crystal surfactant films for electrochemical catalysis," Microporous Materials, vol. 3, 1994, pp. 1-16.

I. Hamachi et al., "Functional Conversion of Myoglobin Bound to Synthetic Bilayer Membranes: From Dioxygen Storage Protein to Redox Enzyme," J. Am. Chem. Soc., vol. 113, No. 25, Dec. 4, 1991, pp. 9625-9630.

Kanya Yamazaki et al., "Secondary nonaqueous electrolyte batteries containing magnetic additives," JP10106577, Apr. 24, 1998 (Abstract only).

Esther S. Takeuchi "Magnetically compatible electrochemical cell," EP0980105, Feb. 16, 2000 (Abstract only).

J. Maruo et al., "Non-Aqueous Electrolyte Secondary Battery," JP10106581, Apr. 24, 1998 (Abstract only).

Jianxin Ma et al., "New method to improve the electrochemical properties of hydrogen storage electrode alloy." SciFinder Scholar, Jinshu Xuebao, 2001, 37(1), pp. 57-60 (Abstract only).

V.I. Markarov et al., "Magnetic properties of powders, and their electrochemical activity," SciFinder Scholar, Tr. Novocherkassk. Politekh. Inst., 1970, 208, pp. 100-103 (Abstract only).

Masahiro Yamaguchi et al., "Effect of a magnetic field on the emf. of a Ni-MH secondary battery," Tohoku Diagaku Kinzoku Zairyo Kenkyusho Kyojiba Chodendo Zairyo Kenkyu Senta Nenji Hokoku, 1992, 329-333 (Abstract only).

* cited by examiner

MAGNETICALLY MODIFIED ELECTRODES CONTAINING AT LEAST ONE CATALYST COMPONENT THAT MEDIATES A SUBATOMIC PARTICLE TRANSFER PROCESS

The present application claims priority under 35 U.S.C. § 119(e) of U.S. Provisional Application No. 60/419,101, filed Oct. 18, 2002, the disclosure of which is incorporated by reference herein.

Part of the work performed during the development of this invention utilized U.S. government funds. The government may therefore have certain rights in this invention.

BACKGROUND OF THE INVENTION

1. Field of the Invention

This invention relates generally to magnetically modified electrodes containing at least one catalyst component that mediates a subatomic particle transfer process. The invention also relates to magnetically modified electrodes containing metalloproteins (metalloenzymes).

2. Background of the Related Art

Bulk properties of molecules in magnetic fields are fairly well understood. In the detailed description of preferred embodiments, it will be shown that interfacial gradients in properly prepared composite materials can be exploited to enhance flux in many types of electrochemical systems such as fuel cells, batteries, membrane sensors, filters, and flux switches. First, however, the following discussion provides a brief overview of the current understanding of magnetic properties in composites. In particular, the discussion below summarizes the thermodynamic, kinetic, and mass transport properties of bulk magnetic materials.

Rudimentary Magnetic Concepts

Paramagnetic molecules have unpaired electrons and are attracted into a magnetic field; diamagnetic species, with all electrons paired, are slightly repelled by the field. Radicals and oxygen are paramagnetic; most organic molecules are diamagnetic; and most metal ions and transition metal complexes are either para- or diamagnetic. How strongly a molecule or species in a solution or fluid responds to a magnetic field is parameterized by the molar magnetic susceptibility, $\chi_m$(cm$^3$/mole). For diamagnetic species, $\chi_m$ is between $(-1$ to $-500) \times 10^{-6}$ cm$^3$/mole, and temperature independent. For paramagnetic species, $\chi_m$ ranges from 0 to +0.01 cm$^3$/mole, and, once corrected for its usually small diamagnetic component, varies inversely with temperature (Curie's Law). While ions are monopoles and will either move with or against an electric field, depending on the sign of the ion, paramagnetic species are dipoles and will always be drawn into (aligned in) a magnetic field, independent of the direction of the magnetic vector. The dipole will experience a net magnetic force if a field gradient exists. Because electrochemistry tends to involve single electron transfer events, the majority of electrochemical reactions should result in a net change in the magnetic susceptibility of species near the electrode.

Magnetic field effects on chemical systems can be broken down into three types: thermodynamic, kinetic, and mass transport. Macroscopic, thermodynamic effects are negligible, although local magnetic field effects may not be. Kinetically, both reaction rates and product distributions can be altered. Transport effects can lead to flux enhancements of several-fold. Quantum mechanical effects are also possible, especially on very short length scales, e.g., below 10 nm. The following summarizes what has been done with homogeneous fields applied to solutions and cells with external laboratory magnets.

Thermodynamics

A magnetic field applied homogeneously by placing a solution between the poles of a laboratory magnet will have a negligible nonexponential effect on the free energy of reaction. $\Delta G_m = -0.5 \Delta \chi_m B^2$ J/mole, where $\Delta G_m$ is the change of the free energy of reaction due to the magnetic field, $\Delta \chi_m$ is the difference in magnetic susceptibility of the products and reactants, and B is the magnetic induction in gauss. For the conversion of a diamagnetic species into a paramagnetic species, $\Delta \chi_m \leq 0.01$ cm$^3$/mole. In a 1 T (1 Tesla=10 kGauss) applied field, $|\Delta G_m| \leq 0.05$ J/mole. Even in the strongest laboratory fields of 10 T, the effect is negligible compared to typical free energies of reaction ($\simeq$kJ/mole). These are macroscopic arguments for systems where the magnet is placed external to the cell and a uniform field is applied to the solution. Microscopically, it may be possible to argue that local fields in composites are substantial, and molecules in composites within a short distance of the source of the magnetic field experience strong local fields. For example, for a magnetic wire or cylinder, the magnetic field falls off over a distance, x, as $x^{-3}$. The field experienced by a molecule 1 nm from the magnet is roughly $10^{21}$ times larger than the field experienced at 1 cm. This argument is crude, but qualitatively illustrates the potential advantage of a microstructural magnetic composite (as an example, in the magnetic/Nafion DuPont) composites, a larger fraction of the redox species are probably transported through the 1.5 nm zone at the interface between the Nafion and the magnetic particles). These redox species must therefore experience large magnetic fields in close proximity to the interface.

Kinetics

Reaction rates, k, are parameterized by a pre-exponential factor, A, and a free energy of activation, $\Delta G^\ddagger$; $k = A \exp[-\Delta G^\ddagger / RT]$. An externally applied, homogeneous magnetic field will have little effect on $\Delta G^\ddagger$, but can alter A. Nonadiabatic systems are susceptible to field effects. Magnetic fields alter the rate of free radical singlet-triplet interconversions by lifting the degeneracy of triplet states (affecting $\Delta G^\ddagger$); rates can be altered by a factor of three in simple solvents. Because magnetic coupling occurs through both electronic nuclear hyperfine interactions and spin-orbit interactions, rates can be nonmonotonic functions of the applied field strength. Photochemical and electrochemical luminescent rates can be altered by applied fields. For singlet-triplet interconversions, magnetic fields alter product distributions when they cause the rate of interconversion to be comparable to the rate free radicals escape solvent cages. These effects are largest in highly viscous media, such as polymer films and micellar environments. Larger effects should be observed as the dimensionality of the system decreases. For coordination complexes, photochemical and homogeneous electron transfer rates are altered by magnetic fields. Spin-orbit coupling is higher in transition metal complexes than organic radicals because of higher nuclear charge and partially unquenched orbital angular momentum of the d-shell electrons. The rate of homogeneous electron transfer between Co(NH$_3$)$_6^{3+}$ and Ru(NH$_3$)$_6^{2+}$ is below that expected for diffusion controlled reactions; in a 7 T magnetic field, the rate is suppressed two- to three-fold. It has been argued that $\Delta\chi_m$ (and $\Delta G_m$) is set by the magnetic susceptibility of the products, reactants, and activated complex, and a highly paramagnetic activated complex accounts for the field effect. For reversible electron transfer at electrodes in magnetic fields, no significant effect is expected. For quasireversible electron transfer with paramagnetic and diamagnetic species, electron transfer rates and transfer coefficients ($\alpha$) are unchanged by magnetic fields applied parallel to electrodes. Magnetic fields applied perpendicular to electrodes in flow cells generate potential differences, which just superimpose on the applied electrode potentials. Potentials of 0.25V have been reported. Reversing the applied magnetic field reverses the sign of the potential difference. This effect does not change standard rate constants, only the applied potential.

Mass Transport

Magnetically driven mass transport effects have been studied in electrochemical cells placed between the poles of large magnets. Effects vary depending on the orientation of the electrode, the relative orientation of the magnetic field and the electrode, forced or natural convection, and the relative concentrations of the redox species and electrolyte.

For a charged species moving by natural or forced convection parallel to an electrode and perpendicular to a magnetic field which is also parallel to the electrode, a Lorentz force is generated which moves the charged particle toward the electrode. This magnetohydrodynamic effect is characterized by $$F=q(E+v\times B), \quad (1)$$

where F, E, v, and B are vectors representing the Lorentz force on the charged species, the electric field, the velocity of the moving species, and the magnetic field, respectively; q is the charge on the species. For flow cells and vertical electrodes, flux enhancements of a few-fold and reductions in the overpotential of a few tenths volts have been found in the presence of the magnetic field. Also, embedded in Equation 1 is the Hall effect; when a charged species moves through a perpendicular magnetic field, a potential is generated. This potential superimposes on the applied potential and causes migration in low electrolyte concentrations.

When the electrode and magnetic field are parallel to the earth, thermal motion leads to vortical motion at the electrode surface unless the field (B) and the current density (j) are spatially invariant and mutually perpendicular. This is parameterized as:

$$F_v=c^{-1}[j\times B]. \quad (2)$$

In Equation (2), $F_v$ is the vector of magnetic force per volume and c is the speed of light. In general, these forces are smaller than Lorentz forces; flux enhancements of a few-fold and potential shifts of 10 to 20 mV are observed. Flux enhancements of paramagnetic and diamagnetic species are similar, but paramagnetic electrolytes enhance the flux of diamagnetic $Zn^{2+}$ two-fold. Vortices suppress thermal motion and eddy diffusion.

The final configuration is for the magnetic field perpendicular to the electrode surface and, therefore, parallel to the electric field. Various, and sometimes inconsistent, results are reported for several configurations: for vertical electrodes in quiescent solution, flux enhancements of $\leq 1000\%$; for electrodes parallel to the earth with forced convection, flux retardations of 10%; and for electrodes parallel to the earth and no forced convection, both enhancements and no enhancements are reported.

This summarizes the thermodynamic, kinetic, and mass transport effects for systems where the magnetic field is applied uniformly across a cell with an external magnet. None of these macroscopic effects predict or address properties dependent on the magnetic susceptibility of the redox species. Quantum mechanical effects may also be important, especially on short length scales.

Reduction of Organohalides

RUSLING, Microporous Materials, 3:1–16 (1994), which is incorporated by reference herein, discloses that the reduction of organohalide complexes may proceed as follows:

$$RX+e \rightarrow R\cdot +X—$$

$$R\cdot +e \rightarrow R—$$

$$R—+(H^+) \rightarrow RH$$

and discloses a useful side reaction for appropriate vicinal dihalides:

$$XCH_2CHX—R+2e \rightarrow CH_2=CH—R+2X.$$

From these different reaction steps, several processes can occur. In terms of environmental remediation of organohalide, reduction can be used to dehalogenate organic species. Halogenated hydrocarbons pose a substantial environmental hazard as they react in the atmosphere to consume ozone. Chemical industry spends substantial resources containing and decomposing halogenated materials. The mechanism shown above also allows for various synthetic routes. An example is double bond formation. As a free radical process, there are numerous systems where magnetic facilitation of the steps would increase energy efficiency producing various commercial products, including polymers.

Biosensors and Assays

Analytical biosensors have been embraced during the last decade as a means of combining the advantages of electrochemical signal transduction with the specificity inherent in biological interactions. For instance, amperometric biosensors are capable of quantifying trace amounts of biological analytes such as glucose, urea, cholesterol, etc. in biological fluids and foods. Analyte may be electrooxidized directly at an electrode, or an enzyme may be immobilized on an electrode such that the reaction product of the enzyme with its substrate is detected by an electrical change, e.g., change in current flow, at the electrode. The current generated at the electrode is a function of the quantity of analyte in a sample.

However, two factors that may affect the quality of the data generated by the signal transduction are as follows. First, compounds unrelated to the analyte of interest may enter the analytical system and interact directly with the electrode assembly, leading to signal generation unrelated to the concentration of the analyte or its derivatives. These interfering species may be introduced either during manufacture of the biosensor or during its use. For example, certain compounds present in sample fluid (e.g., acetomi-nophen and uric acid) are electrochemically "active" and are capable of signal generation independent of the specific biological system employed by the biosensor, via a direct interaction with the electrode. Additionally, compounds that may interact at an electrode may have been introduced during manufacturing for specific purposes, such as to provide antimicrobial or antifungal activity (biocides). These interfering species may produce overlapping current signals, thus decreasing the selectivity of the biosensor. Additionally, the compounds may irreversibly bind to the reactive face of the electrode assembly, leading to fouling of the sensing surface and reduced sensitivity.

Biological membranes play a multi-faceted role in cell biology. In addition to providing the physical barrier that defines a cell or organelle, biological membranes play a role in the cellular processes including the transport of nutrients and waste products, the maintenance of homeostasis within a cell or organelle, intercellular and intracellular signaling, environmental sensing, cellular reproduction, and cellular motility. Assays for components or activities associated with a biological membrane are used both to identify and measure particular types of cells (e.g., in cell typing, cell counting, and assays for pathogens such as bacteria and virus particles) and in basic biological studies of membrane function. The importance of membrane-associated proteins, lipids, and sugars in cellular signaling has also made them important targets for the screening of drugs that affect signaling pathways.

Drug screening assays are often carried out using highly purified membrane-free preparations. For example, screens for inhibitors of a membrane receptor-ligand binding interaction often involve the use of purified detergent-solubilized membrane receptor proteins (or, alternatively, truncated membrane receptor proteins missing their trans-membrane domains). There is a trend, however, toward conducting assays using membrane components in their native state (i.e., assays employing tissue, whole cells or organelles, natural membrane fragments or vesicles, or membrane components reconstituted into synthetic membranes). Assays conducted using these types of complex reagents have several advantages including: (i) membrane components are more likely to have their in vivo characteristics when associated with a membrane; (ii) the use of membrane-bound reagents facilitates the monitoring of interactions involving more than one membrane-associated component; and (iii) the use of membrane-bound reagents facilitates the study of membrane-bound activities (e.g., the measurement of downstream signaling events controlled by a membrane-associated receptor).

There remains, however, a need for improved compositions, articles, and electrodes that may be used in a variety of applications, such as for reduction of organohalides, polymerization reactions, assays, and drug screening. Accordingly, there also remains a need for methods of making these compositions, articles, and electrodes.

SUMMARY OF THE INVENTION

Accordingly, a first embodiment of the present invention is therefore directed to a magnetically modified electrode comprising an electrically conducting material having a catalytic material on at least a portion of at least one surface thereof, wherein the catalytic material comprises: (i) at least one catalyst component that mediates a subatomic particle transfer process; (ii) at least one ion conducting material; and (iii) a plurality of magnetic and/or magnetizable particles.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
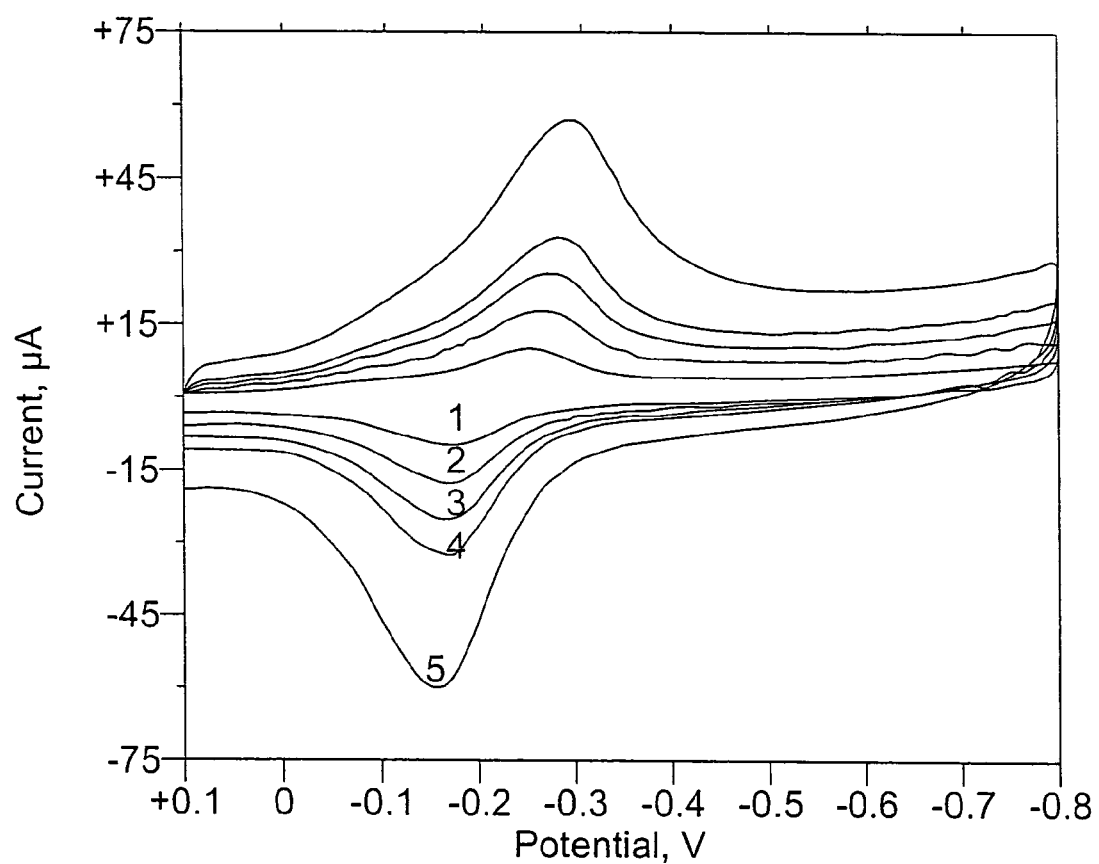
FIG. 1 is a cyclic voltammogram involving a myoglobin-modified electrode, with no magnetic particles, under nitrogen.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

As used herein, the term "within the vicinity of the particle" is intended to mean sufficiently close to the particle for it to exert its effect(s) on the reactant(s) involved in the chemical reaction. Such distances will therefore vary depending, for example, on the nature of the particle, including its composition and size, and the strength of the magnetic field, as well as the reactant(s) involved in the affected chemical reaction.

As used herein, the term "catalytic material" is intended to mean the substance(s) found on the surface of a cathode or anode in a fuel cell responsible for the chemical reaction(s) involved in the production of electrical power and the transfer of that power (e.g. in the form of subatomic particles such as electrons or protons) from the site of the chemical reaction(s). Thus, as used herein, a "catalytic material" contains at least one "catalyst component" (the substance or a component thereof that catalyzes the relevant chemical reaction(s) involved) and at least one ion conducting material. The "catalytic material" may also contain other components, such as a modifying material, which is not directly involved in the chemical reaction(s), and magnetic and/or magnetizable particles, which may or may not be directly involved in the chemical reaction(s).

As used herein, the term "modifying material" is intended to mean a material that affects at least one of the following properties of a substance: hydrophilicity, hydrophobicity, organophobicity, organophilicity, surface charge, dielectric constant, porosity, gas exclusion, gas permeability, deliquescence, wetting, density, electron conductivity and ionic conductivity.

According to the present invention, it has been found that electrode performance may be improved by magnetic modification. Such magnetically modified electrodes may be used in a variety of applications.

In a particularly preferred embodiment, the present invention is directed to a magnetically modified electrode comprising an electrically conducting material having a catalytic material on at least a portion of at least one surface thereof, wherein the catalytic material comprises: (i) at least one catalyst component that mediates a subatomic particle transfer process; (ii) at least one ion conducting material; and (iii) a plurality of magnetic and/or magnetizable particles.

Suitable electrically conducting materials for use in electrodes of the present invention are known and available to those skilled in the art. Illustrative examples of suitable materials include, but are not limited to, the following: metals; carbon, such as graphite; semiconductors; semimetals; magnetic materials; and combinations of two or more thereof. Illustrative examples of suitable metals for use as the electrically conducting material include transition metals, such as Ni, Fe, Zn or Cd, and precious metals, such as Ag, Au, Pt, Ir, Ru, Rh, Os, and Ir. Particularly preferred metals for use as the electrically conducting material include platinum and composites of platinum, such as platinum-ruthenium composites.

Additionally, the electrically conducting material may comprise a mixture of two or more metals, or a metal and a non-metal, such as a polymeric material. Other suitable materials for use as the electrically conducting material in the electrodes according to the present invention include a matrix, e.g., metal matrix, including magnetic particles or magnetic components.

According to certain embodiments of the present invention, the electrically conducting material comprises carbon, e.g., elemental carbon-based materials such as carbon, carbon black, graphitic carbon, pyrolytic carbon, carbon nanotubes, carbon fibrils, graphite, carbon fibers, or mixtures thereof. According to other embodiments, the material may be comprised of conducting carbon-polymer composites, conducting particles dispersed in a matrix (e.g., carbon inks, carbon pastes, metal inks), and/or conducting polymers.

The electrically conducting material may be continuous with no openings therein, such as a rod, foil or sheet, or may be configured to have openings therein, such as a mesh or screen. The material can have any geometrical shape suitable for a predetermined use. Non-limiting examples of such geometries include rods (hollow or solid), circles, squares, triangles, rectangles, and the like.

The electrically conducting material has a catalytic material on at least a portion of at least one surface thereof. According to the various embodiments of the present invention, the catalytic material contains an effective amount of at least one catalyst component that mediates at least one subatomic particle transfer process. Various catalyst components are suitable for use in the catalytic material.

These catalyst components include, but are not limited to, metalloproteins (metalloenzymes) and macrocycles, particularly metal macrocycles (chelates), and may be natural, semi-synthetic or synthetic compounds. Electrodes including such catalyst components are known to those skilled in the art and are described, for example, RUSLING, Microporous Materials, 3:1–16 (1994); NIU et al., J. Electroanalytical Chemistry, 399:41–46 (1995); MIMICA et al., J. Electroanalytical Chemistry, 497:106–113 (2001); NASSER et al., J. Am. Chem. Soc., 117:10986–10993 (1995); RUSLING et al., J. Am. Chem. Soc., 115:11891–11897 (1993); and/or FENG et al., J. Am. Chem. Soc., 123:3013–3020 (2001), each of which is expressly incorporated by reference herein. Illustrative examples of such metalloproteins and macrocycles include, but are not limited to, flavoproteins, proteins containing reducible disulfide groups, cytochromes, iron proteins, copper proteins, molybdenum proteins, nickel proteins, vanadium proteins and quinoproteins. Specific examples of such metalloproteins include, but are not limited to, the following: myoglobin; hemoglobin; cytochrome A; cytochrome B; cytochrome C; metal phthalocyanine tetrasulfonates; cobalt corrin hexacarboxylate (vitamin B12 hexacarboxylate); ferrocyanide; plastocyanin; azurin; and ferredoxins.

The amount of catalyst component(s) present in the catalytic material will vary depending upon the particular catalyst component(s) selected, the reactants involved and the like. Suitable amounts of catalyst component for a particular electrode may therefore be determined empirically by one skilled in the art.

In addition to the catalyst component(s), the catalytic material may also further comprise at least one ion conducting material. Suitable ion conducting materials are known and available to those skilled in the art. Illustrative examples of such ion conducting materials include, but are not limited to, surfactants, particularly amphiphilic surfactants, cationic surfactants and anionic surfactants.

Illustrative examples of anionic surfactants include, but are not limited to, those having: (a) a hydrophobic moiety selected from the group consisting of $C_6$–$C_{20}$ alkyl group, alkylaryl group, and alkenyl group; and (b) a hydrophilic moiety comprising an anionic group selected from the group consisting of sulfate, sulfonate, phosphonate, polyoxyethylene sulfate, polyoxyethylene sulfonate, polyoxyethylene phosphonate, and alkali metal and ammonium salts thereof, or tertiary amino salt group of these anionic groups.

A copolymerizable surfactant comprising $C_2$–$C_{18}$ alkenyl polyoxypropylene or $C_2$–$C_{18}$ polyoxybutylene as the hydrophobic moiety, an anionic group of polyoxyethylene sulfate as the hydrophilic moiety, and an ethylenically-unsaturated double bond may also be useful.

To obtain a more stable macro- or micro-emulsion, an ethylenically-unsaturated polymerizable anionic surfactant may also be used. Specific examples of the copolymerizable anionic surfactant include Mazonm® SAM 211, which is commercially available from PPG Industries Inc. and Adekareasorp® SE-10N (product No.): ammonia salt of α-sulfo-ω-{1-nonylphenoxymethyl-2-(2-propenyloxy)ethoxy}-poly-(oxy-1,2-ethanediyl) manufactured by Asahi Denka Kogyo Co.

As the cationic surfactant, for example, there can be used quaternary ammonium salts wherein at least one higher molecular weight groups (having 6 or more carbon atoms) and two or more lower molecular weight groups (having 1 to 5 carbon atoms) are linked to a common nitrogen atom to produce a cation, resulting in electrical balance. In this case, the anion includes those selected from the group consisting of halide (e.g. bromide, chloride, etc.), acetate, nitrate and lower alkosulfate (e.g. methosulfate, etc.), but are not limited thereto.

Suitable cross-linking agents are known in the art. Illustrative examples of suitable cross-linking agents include, but are not limited to, polyol, polyamine, polycarboxylic acid, and combinations thereof.

Preferred ion conducting materials are amphiphilic surfactants, which are generally molecules with a charged or polar head group and one or more long carbon chains. Illustrative examples of such amphiphilic surfactants include, but are not limited to, DDAB (didodecyldimethylammonium bromide), DODAB (dioctadecyldimethylammonium bromide), CTAB (cetyltrimethylammonium bromide), SDS (sodium dodecylsulfate), PC (phosphatidyl choline) and the like.

The amount of ion conducting material present in the catalytic material will vary depending upon the particular ion conducting material employed, the other components of the membrane electrode assembly, the reactants involved and the like. Suitable amounts of ion conducting material for a particular electrode may therefore be determined empirically by one skilled in the art.

The catalytic material may also further comprise at least one modifying material in addition to the catalyst component(s) and, if present, the ion conducting material. The modifying material affects at least one chemical or physical property of the catalytic material, including, but not limited to, the following: hydrophilicity, hydrophobicity, organophilicity, organophobicity, surface charge, dielectric constant, porosity, gas exclusion, gas permeability, deliquescence, wetting, density, electron conductivity and ionic conductivity.

Suitable modifying materials are known and available to those skilled in the art. Illustrative examples of suitable modifying materials include, but are not limited to, polyalkylenes and derivatives thereof, such as partially or fully fluorinated polyalkylenes (e.g. Teflon). A particularly preferred polyalkylene for use in certain embodiments of the present invention, such as membrane electrode assemblies that employ perfluoroinated sulfonic acid polymers (e.g. Nafion) as the ion conducting material, is polyethylene.

According to other preferred embodiments of the present invention, the modifying material may be a hydrophilic material, such as polyhydroxymethylmethacrylate or polyhydroxyethylmethacrylate, that improves the interfacial humidification of the membrane electrode assembly.

The amount of modifying material present in the catalytic material will vary depending upon the particular components of the membrane electrode assembly, the gaseous reactants involved and the like. Suitable amounts of modifying material for a particular membrane electrode assembly may therefore be determined empirically by one skilled in the art.

The catalytic material in the inventive electrode also further comprises a plurality of magnetic particles and/or magnetizable particles.

In those embodiments of the present invention in which magnetic particles are present, the particles each possess a magnetic field of sufficient strength to alter the rate of and/or distribution of products resulting from a chemical reaction involving the particle or occurring within the vicinity of the particle. Such a chemical reaction may involve mass transport, transfer of subatomic particles (e.g. electrons and protons) and/or flux of a solute.

In those embodiments of the present invention in which magnetizable particles are present, the particles have been exposed to a magnetic field of sufficient strength for a sufficient time to align the magnetic moments of at least a portion of the atoms (preferably a majority and even more preferably a substantial majority) within at least a portion of the particles (and preferably a majority and even more preferably a substantial majority thereof). According to these embodiments of the present invention, the portion of atoms aligned within a given particle is sufficient to alter the rate of and/or distribution of products resulting from a chemical reaction involving the particle or occurring within the vicinity of the particle. Preferably, the alignment of atoms is maintained upon removal of the magnetic field, but this is not required (for example, in the case of superparamagnetic materials). Such a chemical reaction may involve mass transport, transfer of subatomic particles (e.g. electrons and protons) and/or flux of a solute.

The magnetizable particles may be subjected to a magnetic field before, during, and/or after incorporation into the inventive electrode. The magnetic field may be applied, for instance, by use of a permanent magnet or an electromagnet. For instance, a magnet may be brought near or in contact with the particles or immersed into a container holding the particles. Preferably, the magnetic field strength is slightly stronger than the saturation magnetization of the particles, although weaker fields can also be employed. Illustrative examples of suitable field strengths for $Fe_3O_4$ or $Fe_2O_3$ particles are in the range of about 0.05 to about 2.0 T, preferably about 0.1 to about 1.0 T, and more preferably about 0.2 to about 0.5 T.

Examples of suitable materials for use as particles in the electrodes of the present invention include, but are not limited to, the following: permanent magnetic materials, paramagnetic materials, superparamagnetic materials, ferromagnetic materials, ferrimagnetic materials, superconducting materials, anti-ferromagnetic materials, mu metals, and combinations thereof.

According to certain embodiments of the present invention, the particles may comprise a permanent magnetic material. Suitable permanent magnetic materials are known and available to those skilled in the art. Illustrative examples of suitable permanent magnetic materials include, but are not limited to, samarium cobalt, neodynium-iron-boron, aluminum-nickel-cobalt, iron, iron oxide, cobalt, misch metal, ceramic magnets comprising barium ferrite and/or strontium ferrite, and mixtures thereof.

According to other embodiments of the present invention, the particles may comprise a paramagnetic material. Suitable paramagnetic materials are known and available to those skilled in the art. Illustrative examples of suitable paramagnetic materials include, but are not limited to, aluminum, stainless steel, gadolinium, chromium, nickel, copper, iron, manganese, and mixtures thereof.

According to still other embodiments of the present invention, the particles may comprise a superparamagnetic material. Suitable superparamagnetic materials are known and available to those skilled in the art.

According to still other embodiments of the present invention, the particles may comprise a ferromagnetic material. Suitable ferromagnetic materials are known and available to those skilled in the art. Illustrative examples of suitable ferromagnetic materials include, but are not limited to, Ni—Fe alloys, iron, and combinations thereof.

According to still other embodiments of the present invention, the particles may comprise a ferrimagnetic material. Suitable ferrimagnetic materials are known and available to those skilled in the art. Illustrative examples of suitable ferrimagnetic materials include, but are not limited to, rare earth transition metals, ferrite, gadolinium, terbium, and dysprosium with at least one of Fe and Co, and combinations thereof.

According to still other embodiments of the present invention, the particles may comprise a superconducting material. Suitable superconducting materials are known and available to those skilled in the art. Illustrative examples of suitable superconducting materials include, but are not limited to, niobium titanium, yttrium barium copper oxide, thallium barium calcium copper oxide, bismuth strontium calcium copper oxide, and combinations thereof.

According to still other embodiments of the present invention, the particles comprise an anti-ferromagnetic material. Suitable anti-ferromagnetic materials are known and available to those skilled in the art. Illustrative examples of suitable anti-ferromagnetic materials include, but are not limited to, FeMn, IrMn, PtMn, PtPdMn, RuRhMn, and combinations thereof.

Other suitable particles which may be used in the membrane electrode assemblies according to the present invention include $AB_5$ alloys, such as $La_{0.9}Sm_{0.1}Ni_{2.0}Co_{3.0}$, and $AB_2$ alloys, such as $Ti_{0.51}Zr_{0.49}V_{0.70}Ni_{1.18}Cr_{0.12}$ or $MmNi_{3.2}Co_{1.0}Mn_{0.6}Al_{0.2}$, where Mm is misch metal (25 wt % La, 50 wt % Ce, 7 wt % Pr, and 18 wt % Nd). Such materials can be used alone or in combination. Thus, the catalytic material may include stoichiometric particles, such as $Sm_2Co_7$ or $Fe_3O_4$, or non-stoichiometric particles, such as $La_{0.9}Sm_{0.1}Ni_{2.0}Co_{3.0}$, or a combination thereof.

In addition to or in place of the above materials, the particles may comprise a ceramic magnet. Examples of suitable ceramic magnets include, but are not limited to, those made of barium ferrite and/or strontium ferrite.

The amount of magnetic particles and/or magnetizable particles may vary depending upon the particular material present in the particles, the strength of the magnetic field, the other components of the catalytic material and the like. Suitable amounts of magnetic particles and/or magnetizable particles may therefore be determined empirically by one skilled in the art. By way of illustration, magnetic particles and/or magnetizable particles (exclusive of any coatings) may be present in the catalytic material in an amount 0.1 mg/cm$^2$ up to 1.0 mg/cm$^2$, and more preferably in an amount of about 0.1 mg/cm$^2$ to about 0.4 mg/cm$^2$, such as about 0.1 mg/cm$^2$ to about 0.2 mg/cm$^2$.

According to certain preferred embodiments of the present invention, at least a portion of the particles present in the catalytic material are coated with one or more coating layers. For instance, each of the particles may have one coating layer or a plurality of coating layers on at least a portion of their surface. According to such particularly preferred embodiments, the particles have a coating of an inert material and a coating of a modifying material.

When the magnetic particles and/or magnetizable particles are coated with a modifying material, then the particles may be present in the catalytic material in an amount 0.1 mg/cm$^2$ up to 1 mg/cm$^2$, and more preferably in an amount of about 0.1 mg/cm$^2$ to about 0.8 mg/cm$^2$, such as about 0.3 mg/cm$^2$ to about 0.4 mg/cm$^2$.

Suitable inert materials for coating the particles include any materials that do not adversely interact with the environment in which the particles are used. Such coatings can be used, for instance, to protect the particles from the corrosive effects of solvents. Thus, coatings of suitable inert materials render the particle(s) chemically inert and/or mechanically stable. Suitable inert materials are known and available to those skilled in the art.

Preferably, the inert material used to coat the particles is a silane or silicon dioxide. Particularly preferred such coatings include, but are not limited to, trialkoxysilanes, such as 3-aminopropyltrimethoxysilane. By way of illustration and not limitation, if the particles are $Fe_3O_4$, the coating is preferably a silane or silicon dioxide coating prepared via ethanol reduction of tetraethylorthosilicate. Suitable coated particles can be made as disclosed in WO 01/99127, the disclosure of which is herein incorporated by reference in its entirety.

In addition to the inert material, the particles may also have a coating of a modifying material. The modifying material affects at least one chemical or physical property of the particle, including, but not limited to, the following: hydrophilicity, hydrophobicity, organophilicity, organophobicity, surface charge, dielectric constant, porosity, gas exclusion, gas permeability, deliquescence, wetting, density, electron conductivity and ionic conductivity.

Suitable modifying materials are known and available to those skilled in the art. Particularly preferred modifying materials are those that improve the water concentration about the particle(s) and any nearby catalyst component(s) and/or local ionic conductivity. Illustrative examples of suitable modifying materials include, but are not limited to, homopolymers formed from the following monomers: styrene, styrene derivatives, 2-hydroxyethyl acrylate, 2-hydroxyethyl methacrylate, iso-decyl methacrylate, methyl methacrylate, methyl acrylate, vinyl acetate, ethylene glycol, ethylene, 1,3-dienes, vinyl halides, and vinyl esters.

Further illustrative examples of suitable modifying materials include, but are not limited to, copolymers formed from at least one Monomer A and at least one Monomer B. Examples of Monomer A include, but are not limited to, styrene, methyl acrylate, iso-decyl methacrylate, 2-hydroxyethyl acrylate, and 2-hydroxyethyl methacrylate. Examples of Monomer B include, but are not limited to, 4-styrenesulfonic acid and ethylene glycol dimethacrylate.

While the size of the particles is not particularly limited, in certain embodiments, the particles preferably have sizes ranging from about 0.1 microns to about 15 microns, such as about 0.1 to about 10 microns, about 0.5 to about 10 microns, about 2 microns to about 8 microns, or about 3 microns to about 6 microns.

In addition to the electrically conducting material and the catalytic material, the electrode of the present invention may include other components. For instance, the electrode of the invention may include a spacer between the electrically conducting material and the catalytic material layer. Such a spacer may function, e.g., as a chemical linker for holding the catalytic material to the electrically conducting material and/or as a hydrophilic spacer volume (i.e., a spacer volume that reduces direct contact between the surface of the electrically conducting material and the catalytic material, allows both sides of the catalytic material to contact a water or water-like environment (e.g., when the spacer comprises a hydrogel) and/or allows the components of the catalytic material to retain the mobility observed in, e.g., biological membranes). See, e.g., WO99/51984 and U.S. Pat. Nos. 5,637,201; 5,401,378; and 5,766,960, which are incorporated by reference herein.

In addition to the foregoing, the catalytic material may include additives such as stabilizers, gelling agents, crosslinking agents, viscosity reducing agents, viscosity enhancing agents, agents that enhance drying, binders, and other compounds or materials that affect the physical properties of the mixture.

Suitable stabilizers are known in the art. Illustrative examples of suitable stabilizers include, but are not limited to, EDTA, ethlenediamine, pentamethyl-diethylenetriamine, and combinations thereof.

Suitable gelling agents are known in the art. Illustrative examples of suitable gelling agents include, but are not limited to, polymers, such as carboxymethycellulose, polyacrylic acid (e.g., Carbopol 940® from B. F. Goodrich in Brecksville, Ohio, or POLYGEL-4P® from 3V in Bergamo, Italy), and sodium polyacrylate (e.g., CL-15® from Allied Colloids in Yorkshire, England), salts, and combinations thereof.

Suitable cross-linking agents are known in the art. Illustrative examples of suitable cross-linking agents include, but are not limited to, polyol, polyamine, polycarboxylic acid, and combinations thereof.

Suitable viscosity reducing agents are known in the art. Illustrative examples of viscosity reducing agents include, but are not limited to, solvents and combinations of solvents.

Illustrative examples of viscosity enhancing agents include, but are not limited to, celluloses, ionically conductive polymers, such as polyamide-co-diallyldimethyl-ammonium chloride (PAA), inorganic filler adjuncts, such as fumed alumina or silanized fumed silica, and combinations thereof.

Suitable drying enhancement agents are known in the art. Illustrative examples of suitable drying enhancement agents include, but are not limited to, glycerol, vegetable oil, polyethylene glycol, and combinations thereof.

Examples of suitable binders include, but are not limited to, polymers, starches, fatty acids, liposomes, and combinations thereof.

Certain preferred embodiments include non-ionic polymers as binders. Suitable non-ionic polymers include chemically modified cellulosic polymers and polyacrylates. In certain particularly preferred embodiments of the present invention, the binder is hydroxypropyl methylcellulose (HPMC), hydroxy methylcellulose, carboxymethyl cellulose, methyl cellulose, or combinations thereof. Other examples of non-ionic polymeric binders include polyvinylalcohol and polyethylene oxide.

Other preferred embodiments include ion-exchange polymers as binders. Ion-exchange polymers are known and available to those skilled in the art. Illustrative examples of ion-exchange polymers include, but are not limited to, Nafion and poly(vinyl pyridine). While not wishing to be limited to theory, Nafion exhibits superior transport, selectivity, and stability characteristics compared to polymers with no inherent microstructure.

In certain embodiments, the electrode of the present invention includes a catalyst component that mediates oxidation of an interferant in the presence of an oxidant to yield a non-interfering compound that is no longer electrically active at the operating potential of the electrode and thus does not interfere with, e.g., biosensor function. Such a catalyst component may be a natural enzyme, e.g., horseradish peroxidase, or a synthetic catalyst such as an iron (III) porphyrin. Suitable catalyst components include, but are not limited to, horseradish peroxidase, cytochrome c peroxidase, chloroperoxidase, lactoperoxidase, thyroid peroxidase, Japanese radish peroxidase a, Japanese radish peroxidase c, myeloperoxidase, NADH peroxidase, turnip peroxidase $A_1$, turnip peroxidase $A_2$, turnip peroxidase B, turnip peroxidase D, glutathione peroxidase, and transition metal porphyrins such as iron (III) porphyrins. Preferred iron (III) porphyrins include hemin, chloroprotoporphyrin IX iron (III).

According to these embodiments of the present invention, the catalytic material is preferably isolated from electrical contact with the electrically conducting material. This isolation may be achieved by retaining the catalytic material in a discrete layer surrounding the electrically conducting material. For example, a soluble catalytic material in solution may be retained adjacent to the electrically conducting material within a dialysis membrane. Alternatively, a catalytic material may be immobilized within a polymer or copolymer matrix. An immobilized catalytic material may be further restricted by cross-linking to form an insoluble film, or by positioning a physical barrier between the catalytic material and the electrically conducting material.

The electrically conducting material may be modified by chemical or mechanical treatment to improve the immobilization of the catalytic material thereon. For example, the surface(s) may be treated to introduce functional groups for immobilization of reagents and/or catalyst components and/ or to enhance its adsorptive properties. Surface treatment may also be used to influence properties of the surface of the electrically conducting material, e.g., the spreading of water on the surface or the kinetics of electrochemical processes at the surface of the substrate.

Techniques that may be used include exposure to electromagnetic radiation, ionizing radiation, plasmas or chemical reagents such as oxidizing agents, electrophiles, nucleophiles, reducing agents, strong acids, strong bases, and/or combinations thereof. Treatments that etch one or more components of the electrically conducting material may be particularly beneficial by increasing the roughness and therefore the surface area thereof. In the case of composite electrically conducting materials having conductive particles or fibers (e.g., carbon particles or fibrils) in a polymeric matrix or binder, selective etching of the polymer may be used to expose the conductive particles or fibers.

As noted above, treatment of the surface(s) of the electrically conducting material may be advantageous so as to improve or facilitate immobilization, change the wetting properties of the material, increase surface area, increase the binding capacity for the immobilization of the catalytic material, and/or alter the kinetics of electrochemical reactions. In some applications, however, it may be preferable to use untreated materials. For example, carbon ink substrates may be etched prior to immobilization when the application calls for a large dynamic range and therefore a high binding capacity per area of electrode. Oxidative etching (e.g., by oxygen plasma) has additional advantages in that the potential for oxidation of tripropyl amine (TPA) and the contact angle for water are both reduced relative to the unetched ink. The low contact angle for water allows reagents to be adsorbed on the electrically conducting material by application of the reagents in a small volume of aqueous buffer and allowing the small volume to spread evenly over the substrate surface. Assays may also be carried out on unetched carbon ink materials despite the presence of polymeric binders in the ink. In fact, in some applications requiring high sensitivity or low, non-specific binding it is preferred to use unetched carbon ink materials so as to minimize the surface area of exposed carbon and therefore minimize background signals and loss of reagents from non-specific binding of reagents to the exposed carbon.

Depending on the ink used and the process used to apply the ink, the surface of the electrically conducting material may not be easily wettable by aqueous solutions. The low wettability of the material during the adsorption of reagents may be compensated for by adding low concentrations of non-ionic detergents to the reagent solutions so as to facilitate the spreading of the solutions over the surface. Even spreading is especially important during the localized immobilization of a reagent from a small volume of solution. For example, the addition of 0.005–0.04% Triton X-100® allows for the spreading of protein solutions over unetched carbon ink surfaces without affecting the adsorption of the protein to the substrate and without disrupting the ability of a dielectric film applied on or adjacent to the substrate (e.g., a printed dielectric film with a thickness of about 0.5–100 micrometers, about 2–30 micrometers, or about 8–12 micrometers and having a sharply defined edge) to confine fluids to the substrate surface. Preferably, when non-ionic detergents such as Triton X-100 are used to facilitate spreading of reagents (e.g., capture reagents and/or biomembranes) onto unetched screen-printed electrically conducting materials (i.e., so as to allow the immobilization of the reagents), the solutions containing the reagents are allowed to dry onto the surface. It has been found that this drying step greatly improves the efficiency and reproducibility of the immobilization process.

Electrically conducting materials can be derivatized with chemical functional groups that can be used to attach other materials to them. Materials may be attached covalently to these functional groups, or they may be adsorbed non-covalently to derivatized or underivatized substrates. Electrically conducting materials may be prepared with chemical functional groups attached covalently to their surface. These chemical functional groups include but are not limited to COOH, OH, $NH_2$, activated carboxyls (e.g., N-hydroxy succinimide (NHS)-esters, poly-(ethylene glycols), thiols, alkyl (($CH_2$)$_n$) groups, and/or combinations thereof). Certain chemical functional groups (e.g., COOH, OH, $NH_2$, SH, and activated carboxyls) may be used to couple reagents to the surface of the electrically conducting material. Other immobilization and bioconjugation techniques are disclosed in HERMANSON et al., Immobilized Affinity Ligand Techniques (Academic Press, San Diego, 1992); and HERMANSON, Bioconjugate Techniques (Academic Press, San Diego, 1996), which are incorporated by reference herein.

In some embodiments, NHS-ester groups are used to attach other molecules or materials bearing a nucleophilic chemical functional group (e.g., an amine). In a preferred embodiment, the nucleophilic chemical functional group is present on and/or in an electron-transfer protein, either naturally and/or by chemical derivatization.

In other embodiments of the invention, the coating layers are immobilized via the use of functional groups that self-assemble onto the surface of the electrically conducting material. Phospholipid bilayer membranes (e.g., liposomes) will spontaneously fuse onto the surface of gold electrodes comprising a layer of alkane thiols (or alternatively, lipids presenting thiols in their head groups) to give lipid monolayers or bilayers (depending on the nature and density of the adsorbed thiol groups). Alternatively, thiol-containing components in a biological membrane may be used to adsorb the coating layer to a gold surface. Useful functional groups for self-assembly on substrate surfaces include (i) thiols, phosphines and isocyanates on soft metal surfaces such as gold and platinum; (ii) silanes (e.g., chlorosilanes or alkoxysilanes) on oxide surfaces such as silica and indium tin oxide (ITO); and (iii) carboxylate and phosphonate groups on hard metal surfaces and oxide surfaces such as aluminum and ITO. Phospholipid bilayers can, by themselves, spontaneously assemble (by fusion of vesicles or by Langmuir-Blodgett transfer) on some substrate surfaces to form monolayers (e.g., on hydrophobic surfaces) or bilayers (e.g., on oxide surfaces such a silica or ITO).

In embodiments of the present invention employing a mixture of particles, e.g., non-permanent magnet magnetizable particles and permanent magnet particles, it is preferable to shake or stir the mixture prior to use. For instance, in preferred embodiments of the present invention, the non-permanent magnet particles and permanent magnet particles are weighed and placed into a container and the container is sealed. The container may then be shaken at a rate and for a time effective to form a mixture of non-permanent magnet particles and permanent magnet particles. In a preferred embodiment of the present invention, the container is shaken at a rate of about 1,000 oscillations per minute for about 30 minutes.

According to certain methods of the present invention, a coating layer is formed by mixing the catalytic material and the ion conducting material and a solvent, and applying the mixture to at least a portion of a surface of an electrically conducting material substrate. The mixture may also include magnetizable particles and/or magnetic particles, as well as other components. Optionally, the mixture may be dried for a time effective to remove at least a portion of the solvent from the mixture. The components of the mixture can be mixed in any order.

In certain preferred embodiments of the present invention, the binder is dissolved in the solvent and then the at least one electron-transfer protein and/or at least one macrocycle and, optionally, magnetizable particles are added to the solution. The solvent may be heated prior to addition of the binder. For instance, the solvent may be heated to boiling prior to addition of the binder. In other preferred embodiments of the present invention, the solvent is cooled below room temperature prior to addition of the binder.

Solvents suitable for practicing the present invention include any solvent capable of dissolving the binder, if employed, that does not adversely the at least one electron-transfer protein and/or at least one macrocycle and optional magnetizable particles of the coating layer. Examples of suitable solvents include both non-polar and polar solvents. Non-limiting examples of suitable solvents include water; alkanes, such as benzene, toluene and hexane; and alcohols, such as methanol, ethanol, isopropanol, and t-butanol. In certain preferred embodiments of the present invention, the solvent is water. Such solvents can be used alone or in combination.

In principle, the electrodes of the present invention may be used in any reaction involving an electron-transfer protein and/or a macrocycle. In some embodiments, the electrodes of the present invention yield rate enhancements and selectivity of these reactions.

In preferred embodiments of the present invention, the electrodes are used for the reduction or oxidation of reactants. Examples of reactants include, but are not limited to, halocarbons, such as fluorocarbons (e.g., trifluoroacetic acid) and chlorocarbons (e.g., trichloroacetic acid). In some embodiments, the present invention is used in sensors for these substances.

The reduction or oxidation of reactants with the electrodes of the present invention has potential commercial value in medicine and pharmaceuticals as well as in remediation of environmentally disadvantageous halocarbons. Reduction or oxidation of reactants using electrodes of the present invention may also provide a good synthetic route to some polymers and organic species. The present invention may also be useful in treating carbon monoxide poisoning.

Thus, in certain embodiments, the electrodes of the present invention are used to reduce and dehalogenate organic species, e.g., in environmental remediation. Examples of such organic species include, but are not limited to, halocarbons, such as fluorocarbons (e.g., trifluoroacetic acid), chlorocarbons (e.g., tetrachloroethylene, trichloroethylene, trichloroacetic acid, chloroacrylic acid), and bromocarbons (e.g., ethylene dibromide, 1,2-dibromobutane, 1,2-dibromocyclohexane). For instance, an electrode modified with the metalloprotein myoglobin and magnetic microparticles in a DDAB matrix facilitates the reduction of an organo-halocarbon, trichloroacetic acid.

In some embodiments, the electrodes of the present invention are used to reduce nitrite or nitric oxide. For example, nitrite may be reduced to ammonia.

The present invention also provides various synthetic routes. An example is double bond formation. As a free radical process, there are numerous systems where magnetic facilitation of the steps would increase energy efficiency producing various commercial products, including polymers. Thus, magnetic facilitation of these reactions could improve environmental remediation, reduce the cost of handling of halogenated materials, and improve efficiencies of chemical production. Other mechanistic routes that involve free radical processes can potentially be enhanced using the at least one electron-transfer protein and/or macrocycle and/or magnetic modification.

One preferred embodiment of the invention is an assay module, preferably a multi-well plate, having electrodes (e.g., working and/or counter electrodes) that comprise carbon, preferably carbon layers, more preferably screen-printed layers of carbon inks. Some useful carbon inks include materials produced by Acheson Colloids Co. (e.g., Acheson 440B, 423ss, PF407A, PF407C, PM-003A, 30D071, 435A, Electrodag 505SS, and Aquadag™), E. I. Du Pont de Nemours and Co. (e.g., Dupont 7105, 7101, 7102, 7103, 7144, 7082, 7861D, and CB050), Conductive Compounds Inc (e.g., C-100), and Ercon Inc. (e.g., G-451).

In some cases, the use of magnetically modified electrodes leads to different distributions of products than normally observed under electrochemical conditions without magnetic modification.

The electrode of the present invention is typically used with at least one other electrode, namely a reference electrode, but may carry further electrodes such as a counter electrode and/or a dummy electrode. The at least one other electrode may be of similar formulation to the electrode having the coating layer comprising at least one electron-transfer protein and/or at least one macrocycle, but lacks one or more of its active components. Such a dummy third electrode can lead to more reliable results, in that if charge passed at the third electrode is subtracted from charge passed at the working electrode of the present invention, then the resulting charge is solely due to the reaction of interest.

Any electrolyte that does not have a significant negative adverse effect on the electrode of the present invention may be used. Electrolytes in accordance with the invention are known in the art. Examples of electrolytes include, but are not limited to, aqueous electrolytes, such as those including sodium sulfate. In certain embodiments, the electrolyte comprises a sample to be analyzed.

The present invention will be further illustrated by way of the following Examples. These Examples are non-limiting and do not restrict the scope of the invention.

EXAMPLES

Cyclic voltammetric studies were performed on unmodified electrodes and electrodes modified with either (1) didodecyl dimethyl ammonium bromide (DDAB); (2) DDAB and magnetic particles; (3) DDAB and myoglobin; and (4) DDAB, magnetic particles, and myoglobin. As shown in more detail below, under nitrogen, the voltammetry for myoglobin is unaltered by the presence of magnetic microparticles. In the presence of oxygen, the voltammetry is unaltered by the presence of magnetic microparticles. Under nitrogen, in the presence of a halocarbon, trichloroacetic acid (TCAA), the rate of the myoglobin-mediated reduction of TCAA is accelerated by the presence of magnetic particles over what is observed absent the magnetic particles.

The electrodes were formed according to the method of RUSLING, Microporous Materials, 3:1–16 (1996), which is herein incorporated by reference, except that magnetic microparticles were incorporated into some of the electrodes by methods known to those skilled in the art.

Cyclic voltammetric data is shown as validation for the invention. In each case results are shown for electrodes that incorporate magnetic microparticles and similarly formed electrodes that do not incorporate magnetic microparticles.

Examples 1–4

Myoglobin Reduction Under Nitrogen or Oxygen

Figure 2:
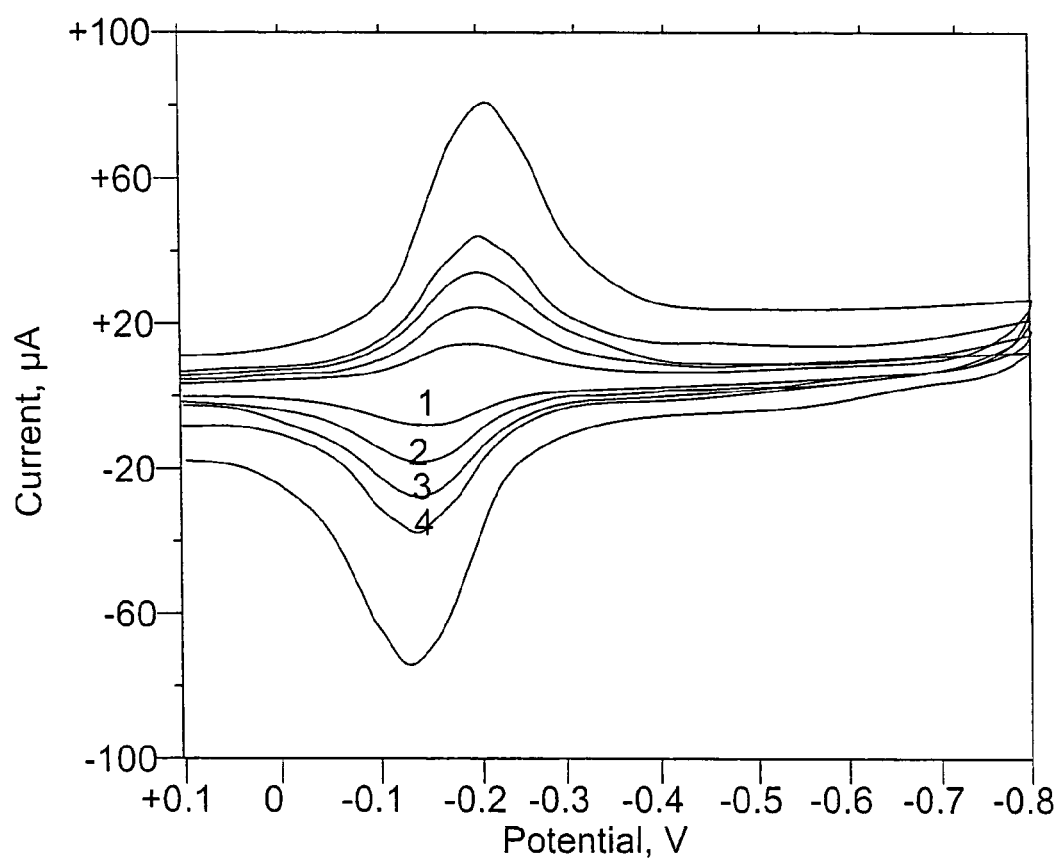
FIG. 2 is a cyclic voltammogram involving a myoglobin-modified electrode, with magnetic particles, under nitrogen.

In Examples 1 and 2, myoglobin was reduced under nitrogen. In this reduction the electron-transfer reaction of myoglobin(III) generates myoglobin(II). Results are shown as a function of scan rate (FIG. 1, no magnets (Example 1); and FIG. 2, 8 (v/v)% magnets (Example 2)). The scan rates for FIGS. 1 and 2 were: (1) 25 mV/s; (2) 50 mV/s; (3) 75 mV/s; (4) 100 mV/s; and (5) 200 mV/s.

For Examples 1 and 2, there was no change in morphology or relative peak heights upon incorporation of magnetic microparticles. There was no magnetic effect on the reduction of myoglobin. Three replicates were performed.

Figure 3:
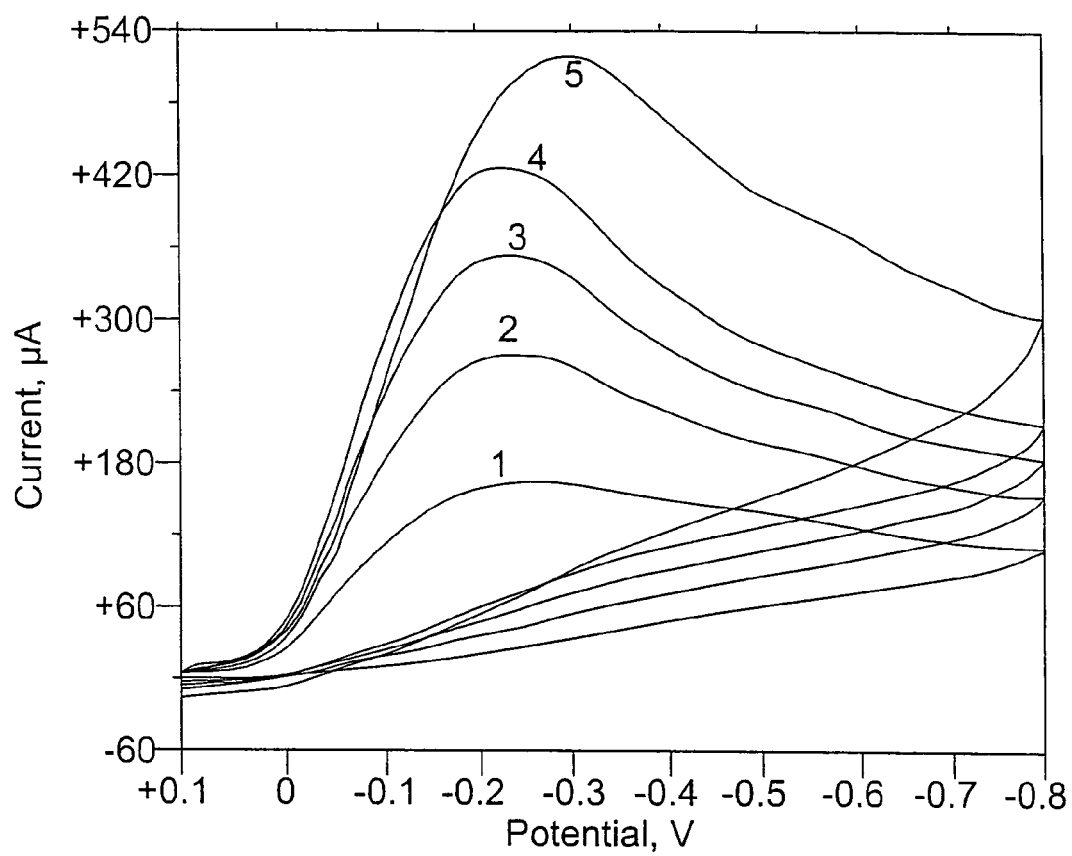
FIG. 3 is a cyclic voltammogram involving a myoglobin-modified electrode, with no magnetic particles, under oxygen.
Figure 4:
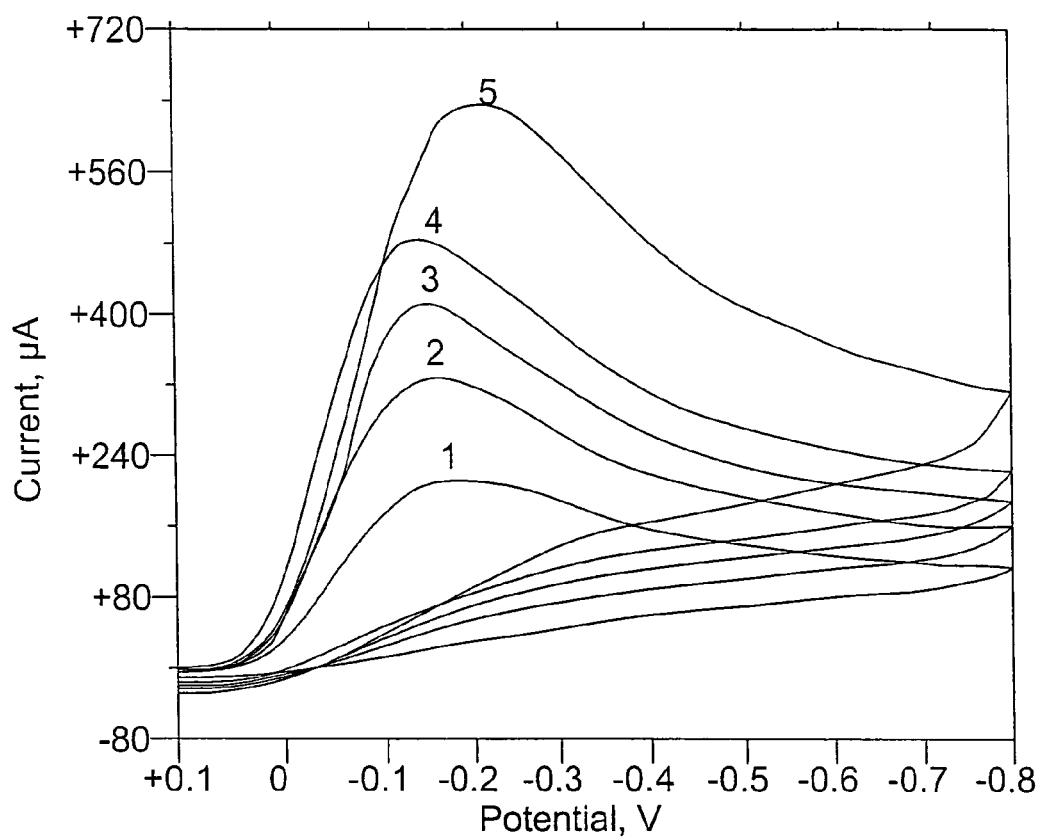
FIG. 4 is a cyclic voltammogram involving a myoglobin-modified electrode, with magnetic particles, under oxygen.

In Examples 3 and 4, myoglobin was reduced under oxygen to determine whether there was a magnetic effect on the oxygen carrying or reduction of the myoglobin oxygen complex. It was the ferrous species that carried oxygen. Results are shown as a function of scan rate (FIG. 3, no magnets (Example 3); and FIG. 4, 8 (v/v)% magnets (Example 4)). The scan rates for FIGS. 3 and 4 were: (1) 25 mV/s; (2) 50 mV/s; (3) 75 mV/s; (4) 100 mV/s; and (5) 200 mV/s.

For Examples 3 and 4, there was no change in morphology or relative peak heights upon incorporation of magnetic microparticles. There was no magnetic effect on the reduction of myoglobin or the myoglobin oxygen complex. Three replicates were performed.

The data of Tables 1–4, below, shows that there was no magnetic effect in the oxygen reduction. This data is based on peak heights for 100 mV/s.

TABLE 1

| | No Magnets | | | |
|---|---|---|---|---|
| | $I_p$ (N2) | $I_p$ (O2) | $I_p$(O2)/ $I_p$(N2) | |
| | 2.28E−05 | 3.78E−04 | 1.65E+01 | |
| | 2.96E−03 | 3.78E−04 | 1.27E+01 | |
| | 2.28E−05 | 4.01E−04 | 1.77E+01 | |
| | | | | 7.58E−01 (????) |
| Average | 2.50E−05 | 3.85E−04 | 15.00 | |
| Stdev | 3.95789E−06 | 1.39E−05 | 2.83 | |
| Rel | 1.38E+01 | 3.81E+00 | 10.79 | |
| n | | 3 | | |

TABLE 2

| | Magnets | | |
|---|---|---|---|
| | Ip(N2) | Ip(O2) | Ip(O2)/Ip(N2) |
| | 2.70E−05 | 4.12E−04 | 1.48E+01 |
| | 2.29E−05 | 3.63E−04 | 1.58E+01 |
| | 2.31E−05 | 3.89E−04 | 1.68E+01 |
| Average | 2.46E−05 | 3.88E−04 | 15.04 |
| Stdev | 2.77E−05 | 2.45E−05 | 1.01 |
| Rel | 1.13E+01 | 6.32E+00 | 6.38 |
| n | | | 3 |

The ratio of current for compositions with magnetic particles to compositions with no magnetic particles was 1.01.

Table 3, below, is directed to t-testing to determine whether ratios are different for similar standard deviations. As shown in Table 3, tcalc was found to be less than tTab, which indicates that there was no statistically significant difference between compositions including magnetic particles and those without magnetic particles.

TABLE 3

| | | |
|---|---|---|
| Spooled | | 1.990118 |
| tcalc | | 0.140418 |
| tTab | Degrees of freedom | 4 |
| | tTab (98%) | 2.776 |
| | 90% | 2.132 |
| | 50% | 0.741 |

Table 4, below, is directed to F-testing to determine whether ratios are different for similar standard deviations. As shown in Table 4, Fcalc was found to be less than Ftab, which indicates that there was no statistically significant difference between compositions including magnetic particles and those without magnetic particles.

TABLE 4

| | |
|---|---|
| F test to see if standard deviations are similar | |
| Fcalc | 6.768319 |
| F tab (98%) | 19 |
| Fcalc < Ftab so they are similar | |

The data of Tables 5–12, below, involves scan rate analysis of electrodes with or without magnetic particles under a nitrogen or oxygen atmosphere.

TABLE 5

| N2 - No Magnets | | |
|---|---|---|
| scan rate (t sqrt(v/V/s)) | Day 4 | |
| 100 (0.316223) | 0.0000228 | |
| 75 (0.273851) | 1.91E−05 | |
| 50 (0.223807) | 1.51E−05 | |
| 25 (0.158114) | 7.038−06 | |
| 200 (0.447214) | 4.03E−05 | |
| 100 (0.316228) | 2.01E−05 | |
| | 0.000112012 | −1.12E−05 |
| | 6.86022E−06 | 1.998E−06 |
| | 0.989651582 | 1.448E−06 |
| | 286.8993774 | 3 |
| | 6.01637E−10 | 6.291E−12 |

TABLE 6

| | N2-Magnets | | | | |
|---|---|---|---|---|---|
| scan rate (t sqrt(v/V/s)) | Day 5 | | Day 5 | | Day 5 |
| 100 (0.316223) | 2.29E−05 | | 2.78E−05 | | 2.31E−05 |
| 75 (0.273851) | 1.73E−05 | | 2.14E−05 | | 1.77E−00 |
| 50 (0.223807) | 1.28E−05 | | 1.81E−05 | | 1.82E−05 |
| 25 (0.158114) | 7.13E−06 | | 8.45E−06 | | 7.55E−06 |
| 200 (0.447214) | 3.92E−05 | | 4.54E−05 | | 4.06E−05 |
| 100 (0.316228) | 2.80E−05 | | 2.68E−05 | | 2.28E−05 |
| | 0.00011231 | −1.2008E−05 | 0.00012598 | −1.15238E−05 | 0.000111780 | −1.08800E−05 |
| | 8.18833E−06 | 1.8585E−06 | 6.08095E−06 | 1.81828E−06 | 9.5826E−06 | 2.85378E−05 |
| | 0.99087387 | 1.34861E−05 | 0.993104102 | 1.31781E−06 | 0.978807027 | 2.07917E−05 |
| | 329.9720558 | 3 | 432.0412482 | 3 | 136.5803048 | 3 |
| | 5.98295E−10 | 5.43121E−12 | 7.50298E−10 | 5.20991E−12 | 3.90429E−10 | 1.29888E−11 |

TABLE 7

N2-Magnets

| scan rate (t sqrt(v/V/s)) | Day 1 | | Day 2 | |
|---|---|---|---|---|
| 100 (0.318228) | 2.96E-05 | | 2.28E-05 | |
| 20 (0.141421) | 8.38E-06 | | 8.50E-06 | |
| 2 (0.044721) | 9.84E-07 | | 1.02E-08 | |
| | 0.000107318 | -4.98E-08 | 8.21773E-05 | -3.52114E-06 |
| | 1.18716E-05 | 2.334E-06 | 9.57215E-06 | 1.93032E-06 |
| | 0.988507553 | 2.262E-06 | 0.986613823 | 1.86280E-06 |
| | 85.01387173 | 1 | 73.70281192 | 1 |
| | 4.35217E-10 | 5.071E-12 | 2.55771E-10 | 3.47031E-12 |

TABLE 8

| | no magnets under N2 | | no magnets under O2 | | |
|---|---|---|---|---|---|
| | Slope | Uncert | Slope | Uncert | O2/N2 ratio |
| | 1.13E-04 | 6.86E-06 | 0.001574128 | 5.76156E-05 | 1.40E+01 |
| | 1.12E-04 | 6.188E-05 | 0.00152027 | 2.15701E-05 | 1.35E+01 |
| | 1.07E-04 | 1.157E+05 | 0.001224498 | 8.96118E-05 | 1.14E+01 |
| Average | 1.11E-04 | | 1.44E-03 | | 1.30E+01 |
| St dev | 3.04E-06 | | 1.88E-04 | | 1.36E+00 |
| Rel | 2.74E+00 | | 1.31E+01 | | 1.06E+01 |
| N | | | 3 | | |

TABLE 9

O2 - No Magnets

| scan rate (t sqrt(v/V/s)) | Day 4 |
|---|---|
| 100 (0.316223) | 4.01E-04 |
| 75 (0.273851) | 3.27E-04 |
| 50 (0.223807) | 2.44E-04 |
| 25 (0.158114) | 1.52E-04 |
| 200 (0.447214) | 4.67E-04 |
| 100 (0.316228) | 2.89E-04 |

TABLE 9-continued

O2 - No Magnets

| scan rate (t sqrt(v/V/s)) | Day 4 | |
|---|---|---|
| | 0.001574128 | -0.000101438 |
| | 5.76158E-05 | 1.44039E-05 |
| | 0.997327809 | 6.79191E-08 |
| | 746.4494156 | 2 |
| | 3.44337E-08 | 9.22601E-11 |

TABLE 10

O2-Magnets

| scan rate (t sqrt(v/V/s)) | Day 5 | | Day 5 | | Day 5 | |
|---|---|---|---|---|---|---|
| 100 (0.316223) | 3.78E-04 | | 4.12E-04 | | 3.89E-04 | |
| 75 (0.273851) | 3.12E-04 | | 3.58E-04 | | 3.32E-04 | |
| 50 (0.223807) | 2.33E-04 | | 2.80E-04 | | 3.85E-04 | |
| 25 (0.158114) | 1.38E-04 | | 1.99E-04 | | 2.00E-04 | |
| 200 (0.447214) | 4.52E-04 | | 5.52E-04 | | 5.22E-04 | |
| 100 (0.316228) | 2.82E-04 | | 3.47E-04 | | 3.35E-04 | |
| | 0.00152027 | -0.000104103 | 0.001364027 | -1.91437E-05 | 0.001063268 | 5.28764E-05 |
| | 2.15701E-05 | 5.39251E-06 | 4.38328E-05 | 1.08582E-05 | 0.000442397 | 0.000110599 |
| | 0.999597546 | 2.54275E-06 | 0.997938964 | 5.18716E-06 | 0.74281309 | 5.21512E-05 |
| | 4967.516177 | 2 | 968.3855902 | 2 | 5.776445554 | 2 |
| | 3.21178E-08 | 1.29311E-11 | 2.58554E-08 | 5.33989E-11 | 1.57105E-08 | 5.4395E-09 |

TABLE 11

O2-Magnets

| scan rate (t sqrt(v(V/s)) | Day 1 | | Day 2 | |
|---|---|---|---|---|
| 100 (0.318228) | 3.76E−04 | | 3.63E−04 | |
| 20 (0.141421) | 1.81E−04 | | 1.52E−04 | |
| 2 (0.044721) | 3.95E−06 | | 1.14E−06 | |
| | 0.001224498 | −6.21717E−06 | 0.001317677 | −4.86074E−05 |
| | 8.96118E−05 | 1.80711E−05 | 9.09684E−05 | 1.83447E−05 |
| | 0.994672848 | 1.74397E−05 | 0.995256514 | 1.77037E−05 |
| | 186.7175476 | 1 | 209.815423 | 1 |
| | 5.6789E−08 | 3.04144E−10 | 6.57607E−08 | 3.13422E−10 |

TABLE 12

| | Magnets under N2 | | Magnets under O2 | | |
|---|---|---|---|---|---|
| | Slope | Uncert | Slope | Uncert | O2/N2 ratio |
| | 1.26E−04 | 6.06085E−08 | 0.001364027 | 4.38328E−05 | 1.08E+01 |
| | 1.12E−04 | 9.5626E−06 | 0.001063268 | 0.000442397 | 9.51E+00 |
| | 8.22E−05 | 9.57215E−05 | 0.001317677 | 9.09684E−05 | 1.60E+01 |
| Average | 1.07E−04 | | 1.25E−03 | | 1.21E+01 |
| St dev | 2.23E−05 | | 1.62E−04 | | 3.45E+00 |
| Rel | 2.10E+01 | | 1.30E+01 | | 2.84E+01 |
| n | 3 | | | | |

Examples 5–9

Trichloroacetic Acid Reduction

Several experiments were performed to evaluate the impact of magnetic particles on the reduction of trichloroacetic acid. In these Examples, the electrodes had a surface area of 0.34 cm$^2$. Conditions for the cyclic voltammograms were as follows: Init E (mV) was 300, High E (mV) was 300, Low E (mV) was −1400, Init P/N was N, V (mV/s) was 10, Sweep Segments was 2, Smpl Int (mV) was 2, Quiet T (s) was 2, Sens (A/V) was 1E-4. These Examples were conducted under a nitrogen atmosphere at ambient temperature and pressure.

Example 5

Figure 5:
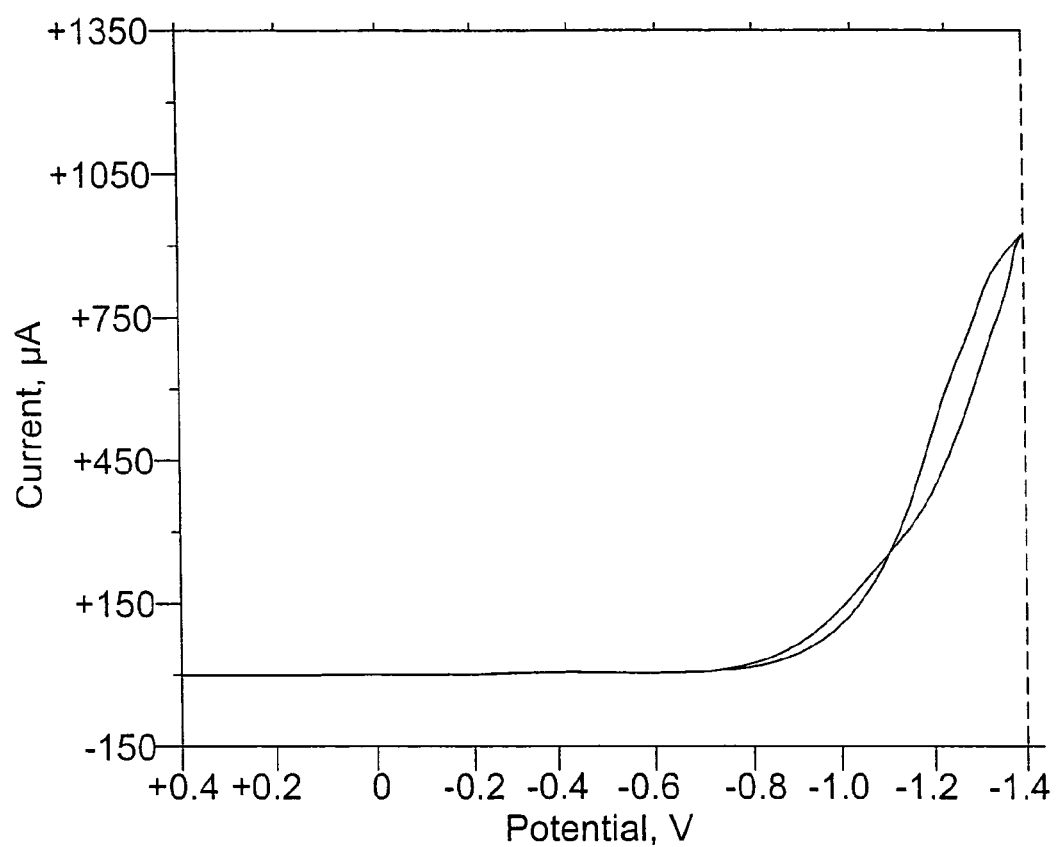
FIG. 5 is a cyclic voltammogram involving trichloroacetic acid reduction, using an unmodified pyrolytic graphite electrode.

Under the conditions described above, an unmodified pyrolytic graphite electrode was placed in an aqueous electrolyte of 20 mM trichloroacetic acid (TCAA) and 0.1 M sodium sulfate. The results are shown in FIG. 5.

Example 6

Figure 6:
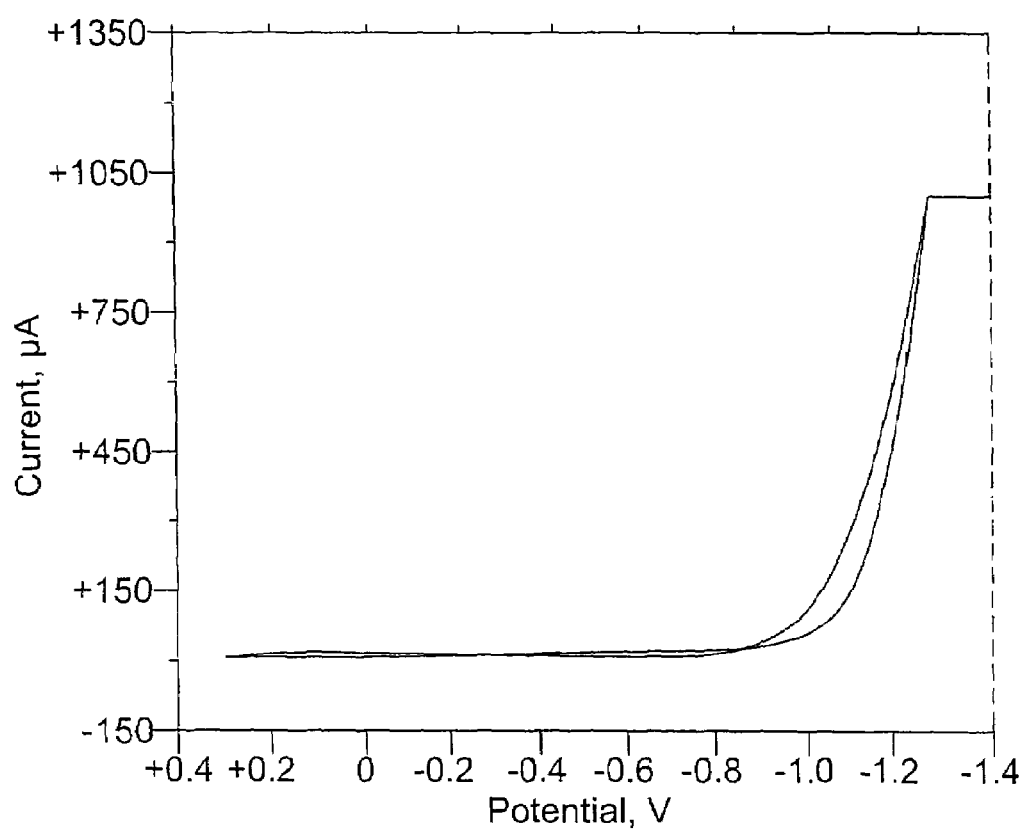
FIG. 6 is a cyclic voltammogram involving trichloroacetic acid reduction, using a didodecyl dimethyl ammonium bromide (DDAB) modified electrode containing no electron-transfer protein and no magnetic particles.

Under the conditions described above, a DDAB-modified pyrolytic graphite electrode containing no magnetic particles and no myoglobin was placed in an aqueous electrolyte of 20 mM trichloroacetic acid (TCAA) and 0.1 M sodium sulfate. The results are shown in FIG. 6.

Example 7

Figure 7:
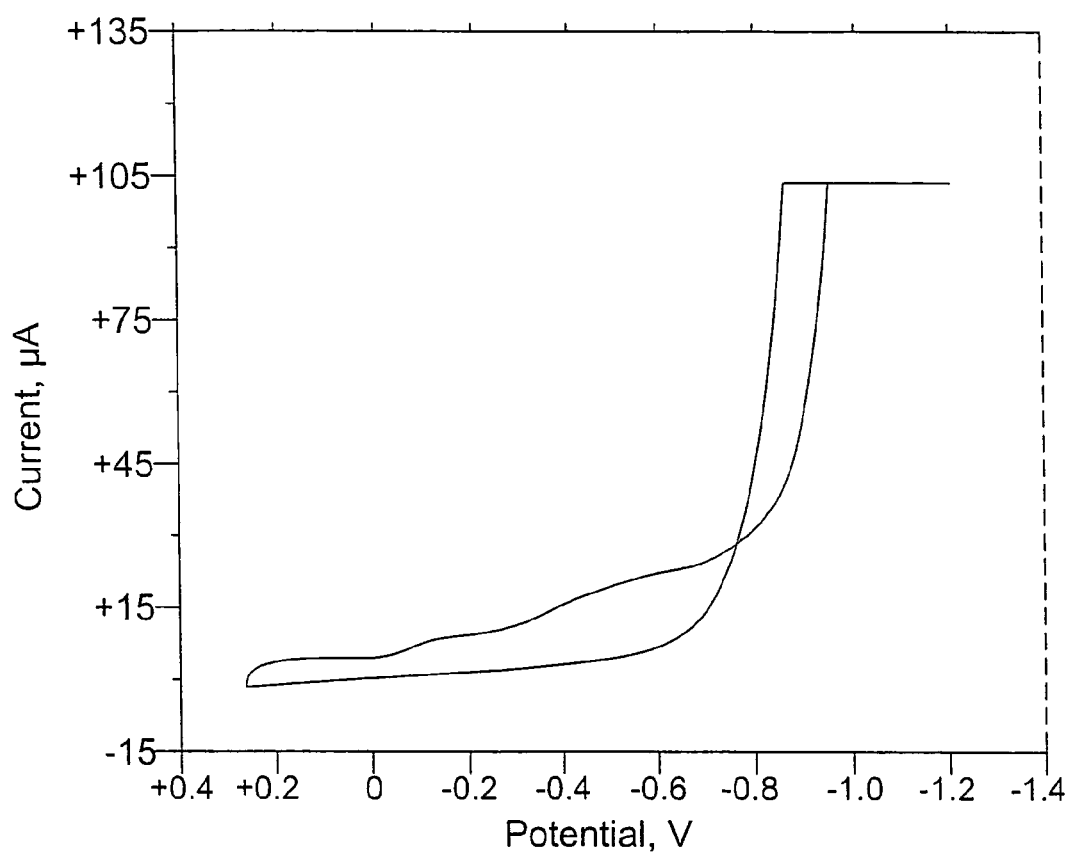
FIG. 7 is a cyclic voltammogram involving trichloroacetic acid reduction, using a DDAB-modified electrode containing magnetic particles but no electron-transfer protein.

Under the conditions described above, a pyrolytic graphite electrode modified with DDAB and 8 (v/v)% magnetic particles, but no myoglobin, was placed in an aqueous electrolyte of 20 mM trichloroacetic acid (TCAA) and 0.1 M sodium sulfate. The results are shown in FIG. 7.

Example 8

Figure 8:
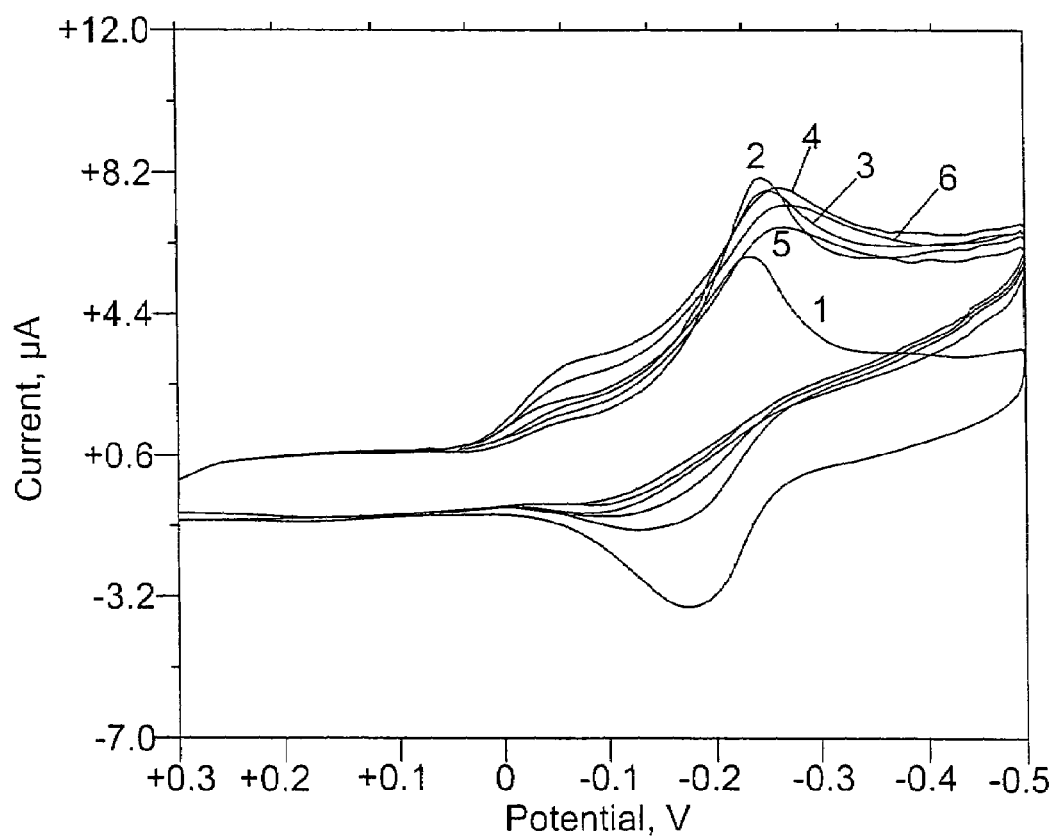
FIG. 8 is a cyclic voltammogram involving trichloroacetic acid reduction, using a DDAB-modified electrode containing myoglobin, i.e., an electron-transfer protein, but no magnetic particles.

Under the conditions described above, a pyrolytic graphite electrode modified with DDAB and myoglobin, but no magnetic particles, was placed in aqueous electrolytes having 0.1 M sodium sulfate and a variable amount of TCAA. Specifically, the aqueous electrolytes had a TCAA concentration of (1) 0 mM; (2) 5 mM; (3) 10 mM; (4) 15 mM; or (5) 20 mM. The results are shown in FIG. 8.

Example 9

Figure 9:
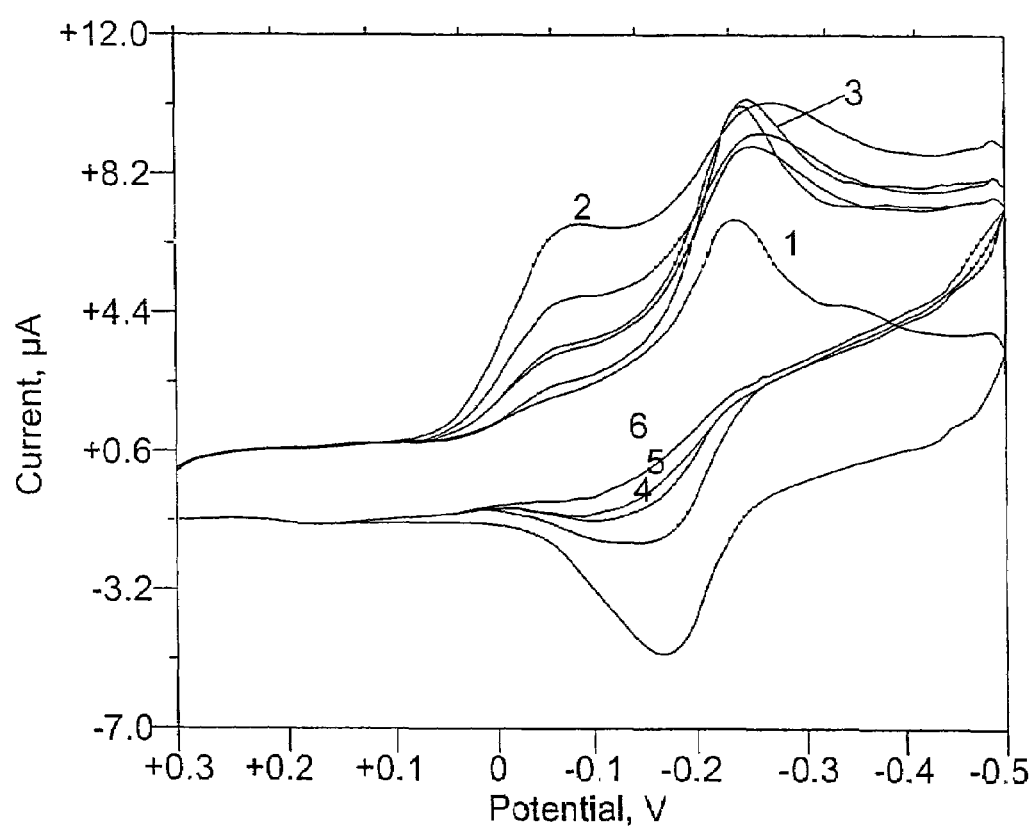
FIG. 9 is a cyclic voltammogram involving trichloroacetic acid reduction, using a DDAB-modified electrode containing myoglobin and magnetic particles.

Under the conditions described above, a pyrolytic graphite electrode modified with DDAB, myoglobin, and 8 (v/v)% magnetic particles, was placed in aqueous electrolytes having 0.1 M sodium sulfate and variable amounts of TCAA. Specifically, the aqueous electrolytes had a TCAA concentration of (1) 0 mM; (2) 5 mM; (3) 10 mM; (4) 15 mM; or (5) 20 mM. The results are shown in FIG. 9.

For these examples, the reduction occurred around −0.8 to −1.0 V versus SCE. When myoglobin+magnets+TCAA were present (Example 6), there was a shift to lower potentials for the reduction of TCAA. Interestingly, there was substantial growth in the pre-wave before the principle myoglobin peak. Mediation of TCAA reduction by myoglobin absent magnets was observed in Example 5, where the pre-wave was not substantially affected and the myoglobin peak increased with TCAA. Both myoglobin-containing systems mediate TCAA reduction. The net current from zero current to the peak of the myoglobin wave at −0.25 V vs. SCE was enhanced by about 50% over the case with no TCAA, both with and without magnets. In the presence of magnets there was substantial growth of the pre wave. The pre-wave at about 0 V represents an additional reduction in the potential to mediate the TCAA reduction.

Having now fully described this invention, it will be understood to those of ordinary skill in the art that the present invention can be carried out with a wide and equivalent range of conditions, formulations, and other parameters without departing from the scope of the invention or any embodiments thereof.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetically modified electrode comprising an electrically conducting material having a catalytic material on at least a portion of at least one surface thereof, said catalytic material comprising: (i) at least one catalyst component comprising a metalloprotein that mediates a subatomic particle transfer process; (ii) at least one ion conducting material; and (iii) a plurality of magnetic and/or magnetizable particles, wherein said magnetic particles have a magnetic field of sufficient strength to alter the rate of and/or distribution of products resulting from a chemical reaction involving said magnetic particles or occurring within the vicinity of said magnetic particles, and further wherein said magnetizable particles have been or are exposed to a magnetic field of sufficient strength for a sufficient time to align the magnetic moments of a portion of atoms at least some of said particles, and further wherein said portion of atoms aligned within each of said magnetizable particles is sufficient to alter the rate of and/or distribution of products resulting from a chemical reaction involving said magnetizable particles or occurring within the vicinity of said magnetizable particles.

2. The electrode of claim 1, wherein said ion conducting material comprises a surfactant.

3. The electrode of claim 1, wherein said alignment is maintained upon removal of said magnetic field.

4. The electrode of claim 1, wherein each of said particles comprises a permanent magnetic material.

5. The electrode of claim 1, wherein each of said particles comprises a paramagnetic material.

6. The electrode of claim 1, wherein each of said particles comprises a superparamagnetic material.

7. The electrode of claim 1, wherein each of said particles comprises a ferromagnetic material.

8. The electrode of claim 1, wherein each of said particles comprises a ferrimagnetic material.

9. The electrode of claim 1, wherein each of said particles comprises a superconducting material.

10. The electrode of claim 1, wherein each of said particles comprises an anti-ferromagnetic material.

11. The electrode of claim 1, wherein said subatomic particle is selected from the group consisting of protons and electrons.

12. The electrode of claim 1, wherein each of said particles has a diameter of about 0.1 microns to about 50 microns.

13. The electrode of claim 1, wherein each of said particles comprises at least one element selected from the group consisting of samarium, neodymium, iron, boron, lithium, manganese, nickel, cobalt and zinc.

14. The electrode of claim 1, wherein each of said particles has at least one coating layer on at least a portion of the surface thereof.

15. The electrode of claim 14, wherein said coating layer comprises at least one inert material.

16. The electrode of claim 15, wherein said inert material comprises a silane or a silicon dioxide or a mixture thereof.

17. The electrode of claim 14, wherein said coating layer comprises at least one modifying material.

18. The electrode of claim 17, wherein said modifying material comprises at least one polymer.

19. The electrode of claim 18, wherein said polymer renders said particle chemically inert and/or mechanically stable.

20. The electrode of claim 17, wherein said modifying material affects at least one property of said particle selected from the group consisting of hydrophilicity, hydrophobicity, organophobicity, organophilicity, surface charge, dielectric constant, porosity, gas exclusion, gas permeability, deliquescence, wetting, density, electron conductivity and ionic conductivity.

21. The electrode of claim 17, wherein said modifying material is selected from the group consisting of homopolymers formed from the following monomers: styrene, styrene derivatives, 2-hydroxyethyl acrylate, 2-hydroxyethyl methacrylate, iso-decyl methacrylate, methyl methacrylate, methyl acrylate, vinyl acetate, ethylene glycol, ethylene, 1,3-dienes, vinyl halides, and vinyl esters.

22. The electrode of claim 17, wherein said modifying material is selected from the group consisting of copolymers formed from at least one Monomer A and at least one Monomer B, wherein said Monomer A is selected from the group consisting of styrene, methyl acrylate, iso-decyl methacrylate, 2-hydroxyethyl acrylate, and 2-hydroxyethyl methacrylate and said Monomer B is selected from the group consisting of 4-styrenesulfonic acid and ethylene glycol dimethacrylate.

23. The electrode of claim 1, wherein each of said particles has a plurality of coating layers.

24. The electrode of claim 23, wherein at least one of said plurality of coating layers comprises an inert material.

25. The electrode of claim 1, wherein said magnetic particle comprises at least one material selected from the group consisting of samarium cobalt, neodynium-iron-boron, iron and iron oxide, cobalt, misch metal, and ceramic magnets comprising barium ferrite and/or strontium ferrite.

26. The electrode of claim 1, wherein said catalyst component is present in an amount between 0.1 and 0.8 mg/cm$^2$.

27. The electrode of claim 1, wherein said catalyst component is present in an amount of about 0.4 mg/cm$^2$.

28. The electrode of claim 1, wherein said particles are present in an amount between 0.1 and 0.8 mg/cm$^2$.

29. The electrode of claim 1, wherein said particles are present in an amount of about 0.4 mg/cm$^2$ exclusive of any coating(s).

30. A magnetically modified electrode comprising an electrically conducting material having a catalytic material on at least a portion of at least one surface thereof, said catalytic material comprising: (i) at least one catalyst component that mediates a subatomic particle transfer process; (ii) at least one ion conducting material; and (iii) a plurality of magnetic and/or magnetizable particles, wherein said magnetic particles have a magnetic field of sufficient strength to alter the rate of and/or distribution of products resulting from a chemical reaction involving said magnetic particles or occurring within the vicinity of said magnetic particles, and further wherein said magnetizable particles comprise anti-ferromagnetic particles that have been or are exposed to a magnetic field of sufficient strength for a sufficient time to align the magnetic moments of a portion of atoms at least some of said particles, and further wherein said portion of atoms aligned within each of said magnetizable particles is sufficient to alter the rate of and/or distribution of products resulting from a chemical reaction involving said magnetizable particles or occurring within the vicinity of said magnetizable particles.

31. The electrode of claim 30, wherein said at least one catalyst component comprises a metalloprotein.

32. The electrode of claim 30, wherein said ion conducting material comprises a surfactant.

33. The electrode of claim 30, wherein said alignment is maintained upon removal of said magnetic field.

34. The electrode of claim 30, wherein said subatomic particle is selected from the group consisting of protons and electrons.

35. The electrode of claim 30, wherein each of said particles has a diameter of about 0.1 microns to about 50 microns.

36. The electrode of claim 30, wherein each of said particles comprises at least one element selected from the group consisting of samarium, neodymium, iron, boron, lithium, manganese, nickel, cobalt and zinc.

37. The electrode of claim 30, wherein each of said particles has at least one coating layer on at least a portion of the surface thereof.

38. The electrode of claim 37, wherein said coating layer comprises at least one inert material.

39. The electrode of claim 38, wherein said inert material comprises a silane or a silicon dioxide or a mixture thereof.

40. The electrode of claim 35, wherein said coating layer comprises at least one modifying material.

41. The electrode of claim 40, wherein said modifying material comprises at least one polymer.

42. The electrode of claim 41, wherein said polymer renders said particle chemically inert and/or mechanically stable.

43. The electrode of claim 40, wherein said modifying material affects at least one property of said particle selected from the group consisting of hydrophilicity, hydrophobicity, organophobicity, organophilicity, surface charge, dielectric constant, porosity, gas exclusion, gas permeability, deliquescence, wetting, density, electron conductivity and ionic conductivity.

44. The electrode of claim 40, wherein said modifying material is selected from the group consisting of homopolymers formed from the following monomers: styrene, styrene derivatives, 2-hydroxyethyl acrylate, 2-hydroxyethyl methacrylate, iso-decyl methacrylate, methyl methacrylate, methyl acrylate, vinyl acetate, ethylene glycol, ethylene, 1,3-dienes, vinyl halides, and vinyl esters.

45. The electrode of claim 40, wherein said modifying material is selected from the group consisting of copolymers formed from at least one Monomer A and at least one Monomer B, wherein said Monomer A is selected from the group consisting of styrene, methyl acrylate, iso-decyl methacrylate, 2-hydroxyethyl acrylate, and 2-hydroxyethyl methacrylate and said Monomer B is selected from the group consisting of 4-styrenesulfonic acid and ethylene glycol dimethacrylate.

46. The electrode of claim 30, wherein each of said particles has a plurality of coating layers.

47. The electrode of claim 46, wherein at least one of said plurality of coating layers comprises an inert material.

48. The electrode of claim 30, wherein said magnetic particle comprises at least one material selected from the group consisting of samarium cobalt, neodynium-iron-boron, iron and iron oxide, cobalt, misch metal, and ceramic magnets comprising barium ferrite and/or strontium ferrite.

49. The electrode of claim 30, wherein said catalyst component is present in an amount between 0.1 and 0.8 mg/cm$^2$.

50. The electrode of claim 30, wherein said catalyst component is present in an amount of about 0.4 mg/cm$^2$.

51. The electrode of claim 30, wherein said particles are present in an amount between 0.1 and 0.8 mg/cm$^2$.

52. The electrode of claim 30, wherein said particles are present in an amount of about 0.4 mg/cm$^2$ exclusive of any coating(s).

* * * * *